(12) United States Patent
Kothari et al.

(10) Patent No.: US 7,863,079 B2
(45) Date of Patent: Jan. 4, 2011

(54) METHODS OF REDUCING CD LOSS IN A MICROELECTROMECHANICAL DEVICE

(75) Inventors: Manish Kothari, Cupertino, CA (US); Clarence Chui, San Jose, CA (US); Sauri Gudlavalleti, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 213 days.

(21) Appl. No.: 12/026,131

(22) Filed: Feb. 5, 2008

(65) Prior Publication Data

US 2009/0195856 A1   Aug. 6, 2009

(51) Int. Cl.
H01L 21/00 (2006.01)
(52) U.S. Cl. ............................. 438/72; 438/32
(58) Field of Classification Search .................... 438/72, 438/27, 29, 31, 32, 65
See application file for complete search history.

(56) References Cited

U.S. PATENT DOCUMENTS

| | | | |
|---|---|---|---|
| 3,728,030 A | 4/1973 | Hawes | |
| 3,955,880 A | 5/1976 | Lierke | |
| 4,377,324 A | 3/1983 | Durand et al. | |
| 4,482,213 A | 11/1984 | Piliavin et al. | |
| 4,519,676 A | 5/1985 | te Velde | |
| 4,786,128 A | 11/1988 | Birnbach | |
| 4,790,635 A | 12/1988 | Apsley | |
| 4,900,136 A | 2/1990 | Goldburt et al. | |
| 4,965,562 A | 10/1990 | Verhulst | |
| 5,022,745 A | 6/1991 | Zayhowski et al. | |
| 5,044,736 A | 9/1991 | Jaskie et al. | |
| 5,075,796 A | 12/1991 | Schildkraut et al. | |
| 5,099,353 A | 3/1992 | Hornbeck | |
| 5,124,834 A | 6/1992 | Cusano et al. | |
| 5,168,406 A | 12/1992 | Nelson | |
| 5,172,262 A | 12/1992 | Hornbeck | |
| 5,192,395 A | 3/1993 | Boysel et al. | |
| 5,212,582 A | 5/1993 | Nelson | |
| 5,226,099 A | 7/1993 | Mignardi et al. | |
| 5,231,532 A | 7/1993 | Magel et al. | |
| 5,293,272 A | 3/1994 | Jannson et al. | |
| 5,311,360 A | 5/1994 | Bloom et al. | |
| 5,312,512 A | 5/1994 | Allman et al. | |
| 5,345,328 A | 9/1994 | Fritz et al. | |
| 5,347,377 A | 9/1994 | Revelli, Jr. et al. | |
| 5,381,040 A * | 1/1995 | Sun et al. ............... | 257/774 |

(Continued)

FOREIGN PATENT DOCUMENTS

CH     680534     9/1992

(Continued)

OTHER PUBLICATIONS

ISR and WO for PCT/US09/032045, filed Jan. 26, 2009.

(Continued)

*Primary Examiner*—Thao Le
(74) *Attorney, Agent, or Firm*—Knobbe Martens Olson & Bear LLP

(57) ABSTRACT

Methods of fabricating an electromechanical systems device that minimize critical dimension (CD) loss in the device are described. The methods provide electromechanical systems devices with improved properties, including high reflectivity.

26 Claims, 15 Drawing Sheets

U.S. PATENT DOCUMENTS

| | | | |
|---|---|---|---|
| 5,381,232 A | 1/1995 | van Wijk | |
| 5,452,138 A | 9/1995 | Mignardi et al. | |
| 5,489,952 A | 2/1996 | Gove et al. | |
| 5,500,761 A | 3/1996 | Goossen et al. | |
| 5,535,047 A | 7/1996 | Hornbeck | |
| 5,552,924 A | 9/1996 | Tregilgas | |
| 5,559,358 A | 9/1996 | Burns et al. | |
| 5,578,976 A | 11/1996 | Yao | |
| 5,608,468 A | 3/1997 | Gove et al. | |
| 5,619,059 A | 4/1997 | Li et al. | |
| 5,619,365 A | 4/1997 | Rhoads et al. | |
| 5,619,366 A | 4/1997 | Rhoads et al. | |
| 5,629,790 A | 5/1997 | Neukermans et al. | |
| 5,638,946 A | 6/1997 | Zavracky | |
| 5,699,181 A | 12/1997 | Choi | |
| 5,710,656 A | 1/1998 | Goosen | |
| 5,739,945 A | 4/1998 | Tayebati | |
| 5,745,281 A | 4/1998 | Yi et al. | |
| 5,771,321 A | 6/1998 | Stern | |
| 5,784,189 A | 7/1998 | Bozler et al. | |
| 5,822,110 A | 10/1998 | Dabbaj | |
| 5,825,528 A | 10/1998 | Goosen | |
| 5,867,302 A | 2/1999 | Fleming et al. | |
| 5,914,803 A | 6/1999 | Hwang et al. | |
| 5,914,804 A | 6/1999 | Goosen | |
| 5,920,421 A | 7/1999 | Choi | |
| 5,943,155 A | 8/1999 | Goossen | |
| 5,943,158 A | 8/1999 | Ford et al. | |
| 5,959,763 A | 9/1999 | Bozler et al. | |
| 5,972,193 A | 10/1999 | Chou et al. | |
| 5,978,127 A | 11/1999 | Berg | |
| 5,986,796 A | 11/1999 | Miles | |
| 6,008,123 A * | 12/1999 | Kook et al. | 438/639 |
| 6,028,690 A | 2/2000 | Carter et al. | |
| 6,031,653 A | 2/2000 | Wang | |
| 6,040,937 A | 3/2000 | Miles | |
| 6,097,145 A | 8/2000 | Kastalsky et al. | |
| 6,104,525 A | 8/2000 | Min | |
| 6,107,177 A | 8/2000 | Lu et al. | |
| 6,137,182 A * | 10/2000 | Hause et al. | 257/774 |
| 6,170,332 B1 | 1/2001 | MacDonald et al. | |
| 6,201,633 B1 | 3/2001 | Peeters et al. | |
| 6,248,654 B1 * | 6/2001 | Lee et al. | 438/597 |
| 6,249,039 B1 | 6/2001 | Harvey et al. | |
| 6,282,010 B1 | 8/2001 | Sulzbach et al. | |
| 6,288,824 B1 | 9/2001 | Kastalsky et al. | |
| 6,295,154 B1 | 9/2001 | Laor et al. | |
| 6,319,824 B1 * | 11/2001 | Lee et al. | 438/639 |
| 6,324,192 B1 | 11/2001 | Tayebati | |
| 6,327,071 B1 | 12/2001 | Kimura et al. | |
| 6,342,452 B1 * | 1/2002 | Coronel et al. | 438/710 |
| 6,351,329 B1 | 2/2002 | Greywal | |
| 6,391,675 B1 | 5/2002 | Ehmke et al. | |
| 6,407,851 B1 | 6/2002 | Islam et al. | |
| 6,447,126 B1 | 9/2002 | Hornbeck | |
| 6,449,084 B1 | 9/2002 | Guo | |
| 6,466,354 B1 | 10/2002 | Gudeman | |
| 6,473,072 B1 | 10/2002 | Comiskey et al. | |
| 6,513,911 B1 | 2/2003 | Ozaki et al. | |
| 6,522,801 B1 | 2/2003 | Aksyuk et al. | |
| 6,537,427 B1 | 3/2003 | Raina et al. | |
| 6,577,785 B1 | 6/2003 | Spahn et al. | |
| 6,597,490 B2 | 7/2003 | Tayebati | |
| 6,602,791 B2 | 8/2003 | Ouellet et al. | |
| 6,625,047 B2 | 9/2003 | Coleman, Jr. | |
| 6,642,913 B1 | 11/2003 | Kimura et al. | |
| 6,653,997 B2 | 11/2003 | Van Gorkom et al. | |
| 6,674,562 B1 | 1/2004 | Miles | |
| 6,680,792 B2 | 1/2004 | Miles | |
| 6,704,475 B2 | 3/2004 | Jin et al. | |
| 6,710,908 B2 | 3/2004 | Miles et al. | |
| 6,760,146 B2 | 7/2004 | Ikeda et al. | |
| 6,778,728 B2 | 8/2004 | Taylor | |
| 6,803,534 B1 | 10/2004 | Chen et al. | |
| 6,808,953 B2 | 10/2004 | Partridge et al. | |
| 6,859,301 B1 | 2/2005 | Islam et al. | |
| 6,881,535 B2 | 4/2005 | Yamaguchi | |
| 6,906,849 B1 | 6/2005 | Mi et al. | |
| 6,940,631 B2 | 9/2005 | Ishikawa | |
| 6,943,448 B2 | 9/2005 | Gabriel et al. | |
| 6,958,847 B2 | 10/2005 | Lin | |
| 6,980,350 B2 | 12/2005 | Hung et al. | |
| 6,982,820 B2 | 1/2006 | Tsai | |
| 6,987,432 B2 | 1/2006 | Lutz et al. | |
| 6,995,890 B2 | 2/2006 | Lin | |
| 7,006,272 B2 | 2/2006 | Tsai | |
| 7,016,095 B2 | 3/2006 | Lin | |
| 7,016,099 B2 | 3/2006 | Ikeda et al. | |
| 7,022,542 B2 | 4/2006 | Combi et al. | |
| 7,027,202 B1 | 4/2006 | Hunter et al. | |
| 7,041,571 B2 | 5/2006 | Strane | |
| 7,042,619 B1 | 5/2006 | McGinley et al. | |
| 7,042,643 B2 | 5/2006 | Miles et al. | |
| 7,105,442 B2 | 9/2006 | Shan et al. | |
| 7,110,158 B2 | 9/2006 | Miles | |
| 7,119,945 B2 | 10/2006 | Cummings et al. | |
| 7,123,216 B1 | 10/2006 | Miles | |
| 7,161,730 B2 | 1/2007 | Floyd | |
| 7,193,768 B2 | 3/2007 | Lin | |
| 7,233,029 B2 | 6/2007 | Mochizuki | |
| 7,252,861 B2 | 8/2007 | Smalley | |
| 7,256,107 B2 | 8/2007 | Takeuchi et al. | |
| 7,256,922 B2 | 8/2007 | Chui | |
| 7,265,050 B2 | 9/2007 | Choi et al. | |
| 7,289,259 B2 | 10/2007 | Chui et al. | |
| 7,291,921 B2 | 11/2007 | Lin | |
| 7,321,457 B2 | 1/2008 | Heald | |
| 7,327,510 B2 | 2/2008 | Cummings et al. | |
| 7,382,515 B2 | 6/2008 | Chung et al. | |
| 7,405,863 B2 | 7/2008 | Tung et al. | |
| 7,417,784 B2 | 8/2008 | Sasagawa et al. | |
| 2001/0003487 A1 | 6/2001 | Miles | |
| 2001/0010953 A1 | 8/2001 | Kang et al. | |
| 2001/0026951 A1 | 10/2001 | Vergani et al. | |
| 2001/0028503 A1 | 10/2001 | Flanders et al. | |
| 2001/0055208 A1 | 12/2001 | Kimura | |
| 2002/0031155 A1 | 3/2002 | Tayebati et al. | |
| 2002/0054422 A1 | 5/2002 | Carr et al. | |
| 2002/0055253 A1 | 5/2002 | Rudhard | |
| 2002/0075555 A1 | 6/2002 | Miles | |
| 2002/0109899 A1 | 8/2002 | Ohtaka et al. | |
| 2002/0110948 A1 | 8/2002 | Huang et al. | |
| 2002/0131682 A1 | 9/2002 | Nasiri et al. | |
| 2002/0135857 A1 | 9/2002 | Fitzpatrick et al. | |
| 2002/0141690 A1 | 10/2002 | Jin et al. | |
| 2002/0146200 A1 | 10/2002 | Kudrle et al. | |
| 2002/0149850 A1 | 10/2002 | Heffner et al. | |
| 2002/0168136 A1 | 11/2002 | Atia et al. | |
| 2002/0195681 A1 | 12/2002 | Melendez et al. | |
| 2003/0015936 A1 | 1/2003 | Yoon et al. | |
| 2003/0036215 A1 | 2/2003 | Reid | |
| 2003/0053078 A1 | 3/2003 | Missey et al. | |
| 2003/0072070 A1 | 4/2003 | Miles | |
| 2003/0091072 A1 | 5/2003 | Wang et al. | |
| 2003/0112096 A1 | 6/2003 | Potter | |
| 2003/0119221 A1 | 6/2003 | Cunningham et al. | |
| 2003/0123126 A1 | 7/2003 | Meyer et al. | |
| 2003/0138213 A1 | 7/2003 | Jiin et al. | |
| 2003/0164350 A1 | 9/2003 | Hanson et al. | |
| 2003/0201784 A1 | 10/2003 | Potter | |
| 2003/0231373 A1 | 12/2003 | Kowarz et al. | |
| 2004/0008396 A1 | 1/2004 | Stappaerts | |
| 2004/0056742 A1 | 3/2004 | Dabbaj | |
| 2004/0058532 A1 | 3/2004 | Miles et al. | |

| | | |
|---|---|---|
| 2004/0070813 A1 | 4/2004 | Aubuchon |
| 2004/0080035 A1 | 4/2004 | Delapierre |
| 2004/0080807 A1 | 4/2004 | Chen et al. |
| 2004/0100680 A1 | 5/2004 | Huibers et al. |
| 2004/0124073 A1 | 7/2004 | Pilans et al. |
| 2004/0124483 A1 | 7/2004 | Partridge et al. |
| 2004/0125281 A1 | 7/2004 | Lin et al. |
| 2004/0136045 A1 | 7/2004 | Tran |
| 2004/0136076 A1 | 7/2004 | Tayebati |
| 2004/0150869 A1 | 8/2004 | Kasai |
| 2004/0174583 A1 | 9/2004 | Chen et al. |
| 2004/0201908 A1 | 10/2004 | Kaneko |
| 2004/0207497 A1 | 10/2004 | Hsu et al. |
| 2004/0217919 A1 | 11/2004 | Piehl et al. |
| 2004/0226909 A1 | 11/2004 | Tzeng |
| 2004/0240032 A1 | 12/2004 | Miles |
| 2005/0014374 A1 | 1/2005 | Partridge et al. |
| 2005/0024557 A1 | 2/2005 | Lin |
| 2005/0046919 A1 | 3/2005 | Taguchi et al. |
| 2005/0046922 A1 | 3/2005 | Lin et al. |
| 2005/0128565 A1 | 6/2005 | Ljungblad |
| 2005/0249966 A1 | 11/2005 | Tung et al. |
| 2006/0006138 A1 | 1/2006 | Lin |
| 2006/0018348 A1 | 1/2006 | Przybyla et al. |
| 2006/0024620 A1 | 2/2006 | Nikkel et al. |
| 2006/0024880 A1 | 2/2006 | Chui et al. |
| 2006/0065940 A1 | 3/2006 | Kothari |
| 2006/0066511 A1 | 3/2006 | Chui |
| 2006/0066932 A1 | 3/2006 | Chui et al. |
| 2006/0067651 A1 | 3/2006 | Chui |
| 2006/0077502 A1 | 4/2006 | Tung |
| 2006/0077516 A1 | 4/2006 | Kothari |
| 2006/0077518 A1 | 4/2006 | Chui et al. |
| 2006/0079048 A1 | 4/2006 | Sampsell et al. |
| 2006/0094143 A1 | 5/2006 | Haluzak |
| 2006/0119922 A1 | 6/2006 | Faase et al. |
| 2006/0203325 A1 | 9/2006 | Faase et al. |
| 2007/0019280 A1 | 1/2007 | Sasagawa et al. |
| 2007/0040777 A1 | 2/2007 | Cummings |
| 2007/0041703 A1 | 2/2007 | Wang |
| 2007/0096300 A1 | 5/2007 | Wang et al. |
| 2007/0206267 A1 | 9/2007 | Tung |
| 2007/0247401 A1 | 10/2007 | Sasagawa et al. |
| 2007/0249079 A1 | 10/2007 | Sasagawa et al. |
| 2008/0026328 A1 | 1/2008 | Miles |
| 2008/0030825 A1 | 2/2008 | Sasagawa et al. |
| 2008/0094686 A1 | 4/2008 | U'Ren |
| 2008/0100899 A1 | 5/2008 | Shimokawa et al. |
| 2008/0144163 A1 | 6/2008 | Floyd |
| 2008/0151352 A1 | 6/2008 | Chung et al. |
| 2008/0158645 A1 | 7/2008 | Chiang |
| 2008/0226929 A1 | 9/2008 | Chung et al. |
| 2008/0279498 A1 | 11/2008 | Sampsell et al. |
| 2008/0310008 A1 | 12/2008 | Chan |
| 2008/0314866 A1 | 12/2008 | Chui et al. |
| 2009/0009444 A1 | 1/2009 | Heald et al. |
| 2009/0315567 A1 | 12/2009 | Chou et al. |

FOREIGN PATENT DOCUMENTS

| | | |
|---|---|---|
| DE | 10228946 | 1/2004 |
| EP | 0 035 299 | 9/1983 |
| EP | 1 170 618 | 1/2002 |
| EP | 1 197 778 | 4/2002 |
| EP | 1 484 635 | 12/2004 |
| EP | 1643288 | 4/2006 |
| FR | 2824643 | 10/1999 |
| JP | 06301054 | 10/1994 |
| JP | 08293580 | 11/1996 |
| JP | 2002-277771 | 9/2002 |
| JP | 2002-341267 | 11/2002 |
| JP | 2003-215475 | 7/2003 |
| JP | 2004157527 | 6/2004 |
| WO | WO 01/56919 | 8/2001 |
| WO | WO 02/38491 | 5/2002 |
| WO | WO 02/079853 | 10/2002 |
| WO | WO 03/029827 | 4/2003 |
| WO | WO 2004/000717 | 12/2003 |
| WO | WO 2005/006364 | 1/2005 |
| WO | WO 2006/036392 | 4/2006 |
| WO | WO 2006/073111 | 7/2006 |
| WO | WO 2006/123299 | 11/2006 |
| WO | WO 2007/060416 | 5/2007 |

OTHER PUBLICATIONS

Brosnihan et al., "Optical IMEMS—A fabrication process for MEMS optical switches with integrated on-chip electronic," Transducers, Solid-State Sensors, Actuators and Microsystems, 12$^{th}$ International Conference 2003, vol. 2, issue, 8-12 pp. 1638-1642, Jun. 2003.

Chui et al., "The iMOD display: considerations and challenges in fabricating MOEMS on large area glass substrates," Proceedings of SPIE, vol. 6466, Jan. 22, 2007.

Dai et al., "A CMOS surface micromachined pressure sensor," Journal of the Chinese institute of Engineers, 1999, vol. 22, No. 3 (May), pp. 375-380.

Dai et al., "A maskless post-CMOS bulk micromachining process and its application," Journal of Micromechanics and Microengineering, vol. 15, No. 12, pp. 2366-2371, IOP Publishing, Dec. 2005.

Dai at el., "A Wet Etching Post-process for CMOS-MEMS RF Switches," Nano/Micro Engineered and Molecular Systems, 2007. NEMS '07. 2$^{nd}$ IEEE International Conference, pp. 968-971, Jan. 2007.

Dowling et al., "Selective wet-etching of filtered-arc-deposited TiN films on Cr sacrificial layers " Proceedings of the SPIE—The International Society for Optical Engineering, vol. 5276, No. 1, pp. 213-220.

Fang et al., "Modeling the effect of etch holes on ferromagnetic MEMS," Magnetics, IEEE Transactions, vol. 37,, Issue 4, Part 1, pp. 2637-2639, Jul. 2004.

Ju et al., "Design and fabrication of a high fill-factor microbolometer using double sacrificial layers," Proceedings of the SPIE—The International Society for Optical Engineering, vol. 3698, pp. 180-189, pril 1999.

Lee et al., "Improvement of the surface characteristics of sputtered metal layer for a MEMS micro-mirror switch," Thin Solid Films, vol. 447, Jan. 30, 2004, pp. 615-618.

Ma et al., "A novel integrated multistage optical MEMS-mirror switch architecture design with shuffle Benes inter-stage connecting principle," Optics Communications 242 (2004), pp. 179-189.

Mark W. Miles, "MEMS-based interferometric modulator for display applications," Proceedings of SPIE, vol. 3876, Aug. 1999, pp. 20-28.

Normand et al., "A new masking method for protecting silicon surfaces during anisotropic silicon wet etching," Microelectronic Engineering 61-62 (2002), pp. 895-900.

Tabata et al., "In situ observation and analysis of wet etching process for micro electro-mechanical systems," Micro Electro Mechanical Systems, IEEE, pp. 99-102, Jan. 1991.

Zhu et al., "Investigation of fabricating ultra deep and high aspect ratio electrical isolation trench without void," Solid-State and Integrated Circuits Technology, 2004. Proceedings. 7$^{th}$ International Conference, vol. 3 pp. 1892-1895, Oct. 2004.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.

Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.

Fork, et al., "P-67: Chip on Glass Bonding using StressedMetal™ Technology" Sid 05 Digest, May 24, 2005.

Goossen et al., "Possible Display Applications of the Silicon Mechanical Anti-Reflection Switch," Society for Information Display (1994).

Joannopoulos et al., "Photonic Crystals: Molding the Flow of Light," Princeton University Press (1995).

Magel, "Integrated Optic Devices Using Micromachined Metal Membranes," SPIE vol. 2686, 0-8194-2060-Mar. (1996).

Solid-State and Integrated Circuits Technology. Proceedings. 7th International Conference, pp. 1848-1851. 2004.

International Preliminary Report on Patentability for PCT/US09/032045, issued on Aug. 10, 2010.

Takacs et al., "UV Baked/Cured Photoresist Used as a Sacrificial Layer in MEMS Fabrications." Army Research Laboratory, ARL-MR-602, Feb. 2005.

* cited by examiner

METHODS OF REDUCING CD LOSS IN A MICROELECTROMECHANICAL DEVICE

BACKGROUND

Field of the Invention

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One aspect provides a method of fabricating an electromechanical systems device that includes providing a sacrificial material and forming a first metal layer over the sacrificial material. The first metal layer can be etched to form at least one first opening in the first metal layer, and the at least one first opening exposes a first surface of the sacrificial material. The method of fabricating an electromechanical systems device can include forming a second layer over the first surface of the sacrificial material. Typically, the second layer of material has a smaller thickness dimension than the first metal layer. The second layer can then be etched to form at least one second opening in the second layer. In an embodiment, the second opening exposes at least a portion of the first surface of the sacrificial material and has a smaller dimension than the first opening.

Another aspect provides a method for fabricating an electromechanical systems device that includes providing a sacrificial material and forming a first metal layer over the sacrificial material. The first metal layer can be etched to form at least one opening in the first metal layer, and the at least one opening in the first metal layer exposes a first surface area of the sacrificial material. The method of fabricating an electromechanical systems device can include forming a second layer over the first surface area of the sacrificial material. Typically, the second layer has a smaller thickness dimension than the first metal layer. A first masking layer can be formed over the second layer and over a portion of the first surface area of the sacrificial material, thereby forming an unmasked portion of the second layer over the first surface area. The method can then include etching the unmasked portion of the second layer to form at least one opening in the second layer. The at least one opening in the second layer exposes a second surface area of the sacrificial material. In an embodiment, the resulting exposed second surface area of the sacrificial material is smaller than the first surface area of the sacrificial material. Afterward, the first masking layer can optionally be removed.

Another aspect provides an interferometric modulator including a substrate, an optical layer patterned into rows, a mechanical layer patterned into columns, and a mirror layer separated from the optical layer by a vertical gap. The mirror layer can include a plurality of mirrors, and the thickness of the mirror layer can be greater than or equal to about 0.75 microns. The plurality of mirrors are separated from one another by a horizontal gap that is less than or equal to about 7 microns.

Another aspect provides an electromechanical device that includes a mirror. The mirror can include a core portion having an exposed reflective surface and an overlaying mirror extension portion having an exposed reflective surface. The exposed reflective surfaces of the core portion and the mirror extension portion can be co-planar.

DETAILED DESCRIPTION OF THE PREFERRED EMBODIMENT

Figure 1:
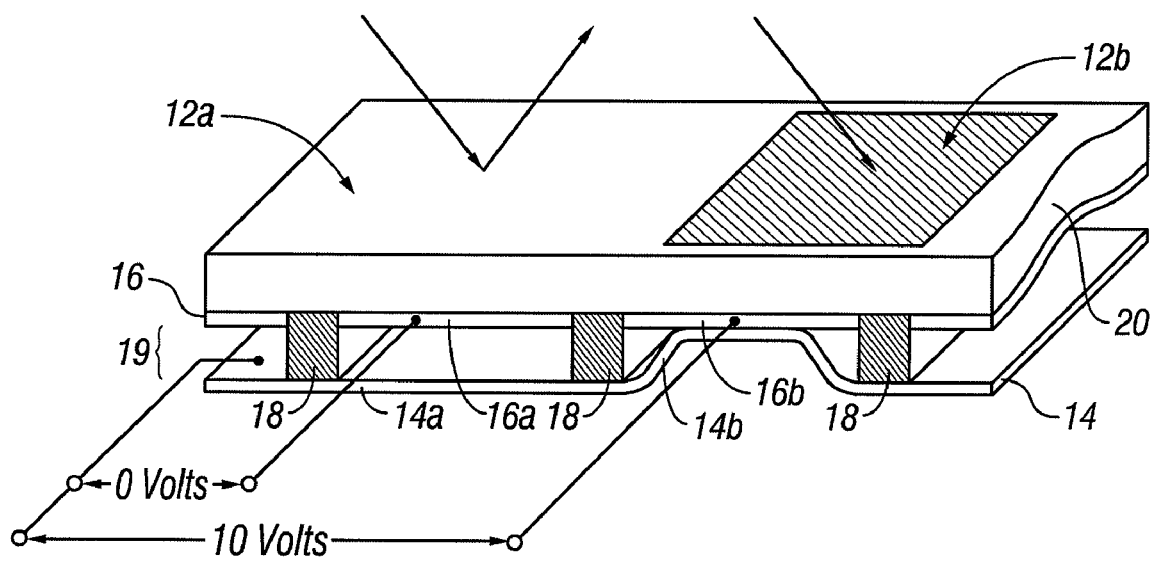
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In many MEMS devices (including certain interferometric modulators), the mechanical properties are controlled by the design and geometry of the mechanical layer and the optical properties are separately controlled by the mirror layer. One desirable optical property of the mirror layer in MEMS devices, as perceived by the end user, is brightness. The level of brightness can be increased by providing a mirror layer with a large surface area. However, some of the manufacturing steps used in the creation of MEMS devices, including etching, may generate erosion at the outer edge of the mirror layer resulting in critical dimension (CD) loss, ultimately decreasing the surface area of the mirror layers. Desirably, the mirror layer in a MEMS device is provided with a relatively large mirror thickness, such that the mirror has sufficient rigidity to maintain flatness over a wide temperature range. However, as the thickness of the mirror increases, a greater degree of etching is often desired in the manufacture of the MEMS device, which further increases the CD loss. Greater CD loss can be attributed to the isotropic nature and inherent aspect ratio of an etchant's etching profile in that an etchant necessarily removes material extending out in a horizontal direction as it removes material in the vertical direction. As a result, longer etching times or etchants with higher etching rates that are needed to penetrate thicker material layers allow an etchant to etch farther in the horizontal direction and thereby increase CD loss. Accordingly, in some embodiments described herein, methods of manufacturing a MEMS device are provided that result in low CD loss to the mirror layer. The manufacturing processes described herein may be used to provide MEMS devices with both high reflectivity and high rigidity in the mirror layers.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
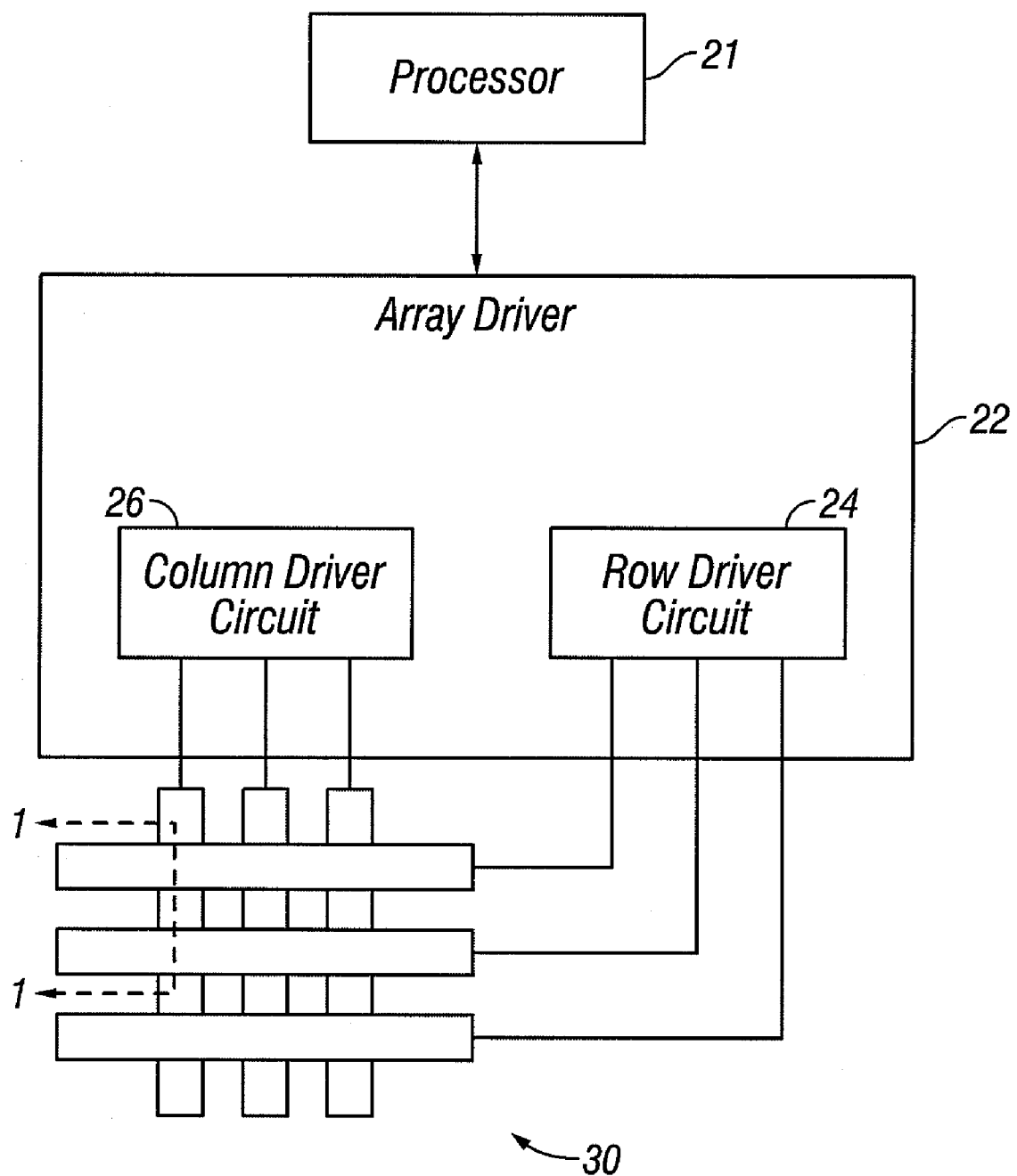
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
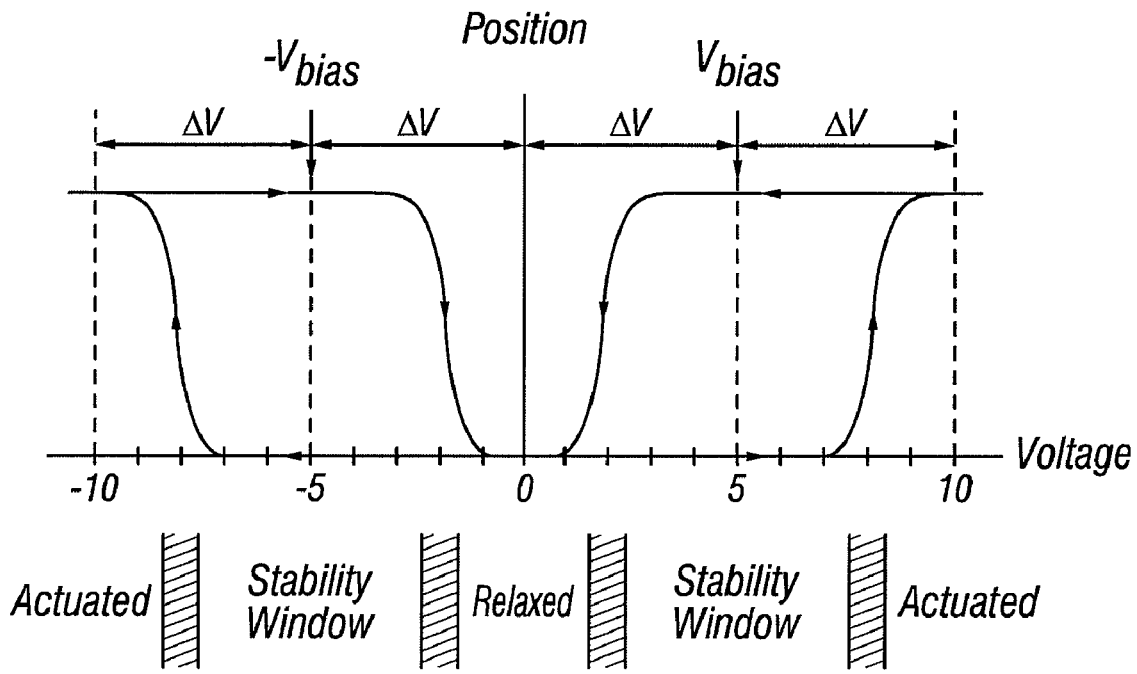
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
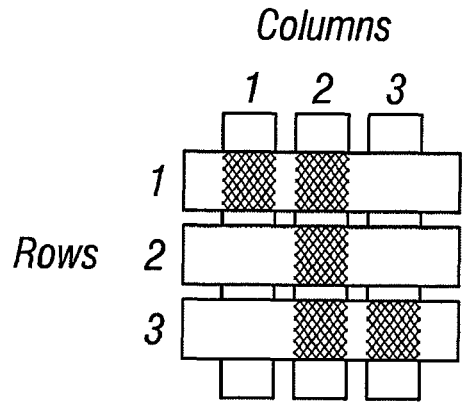
FIGS. 5A and 5B illustrate one exemplary timing diagram for row and column signals that may be used to write a frame of display data to the 3×3 interferometric modulator display of FIG. 2.
Figure 5B:
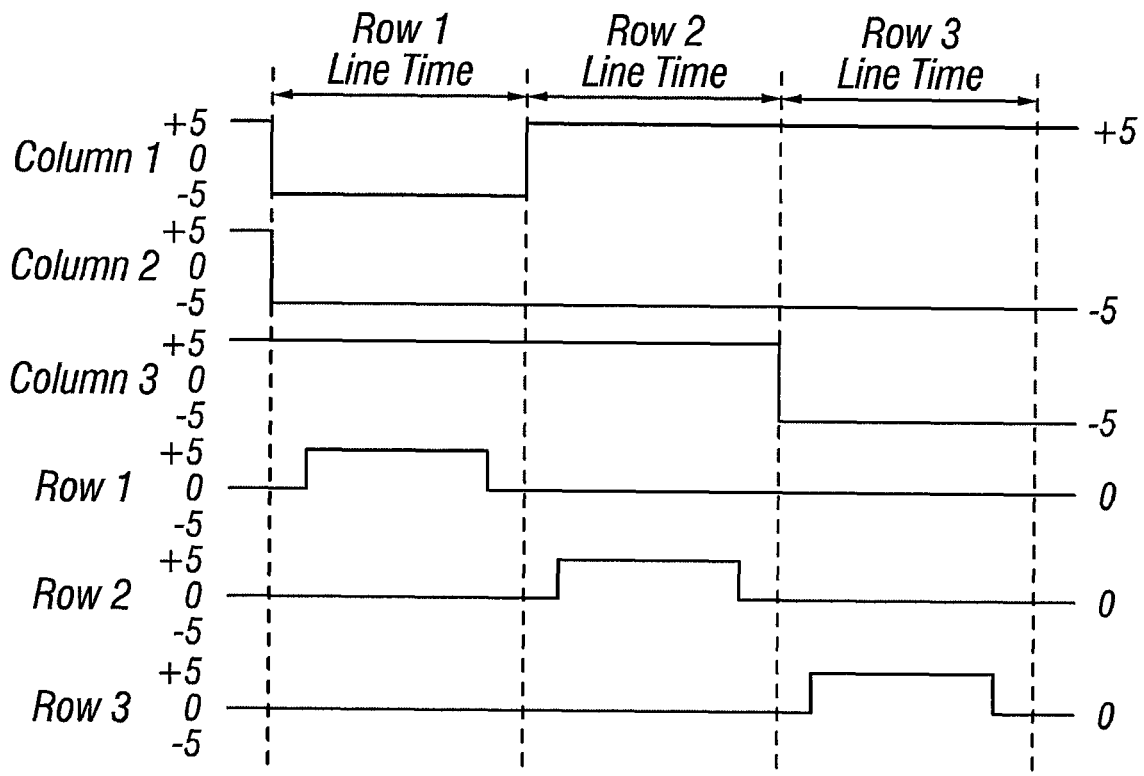

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
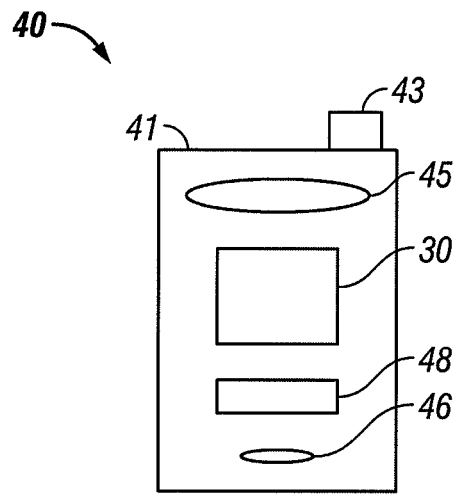
FIGS. 6A and 6B are system block diagrams illustrating an embodiment of a visual display device comprising a plurality of interferometric modulators.
Figure 6B:
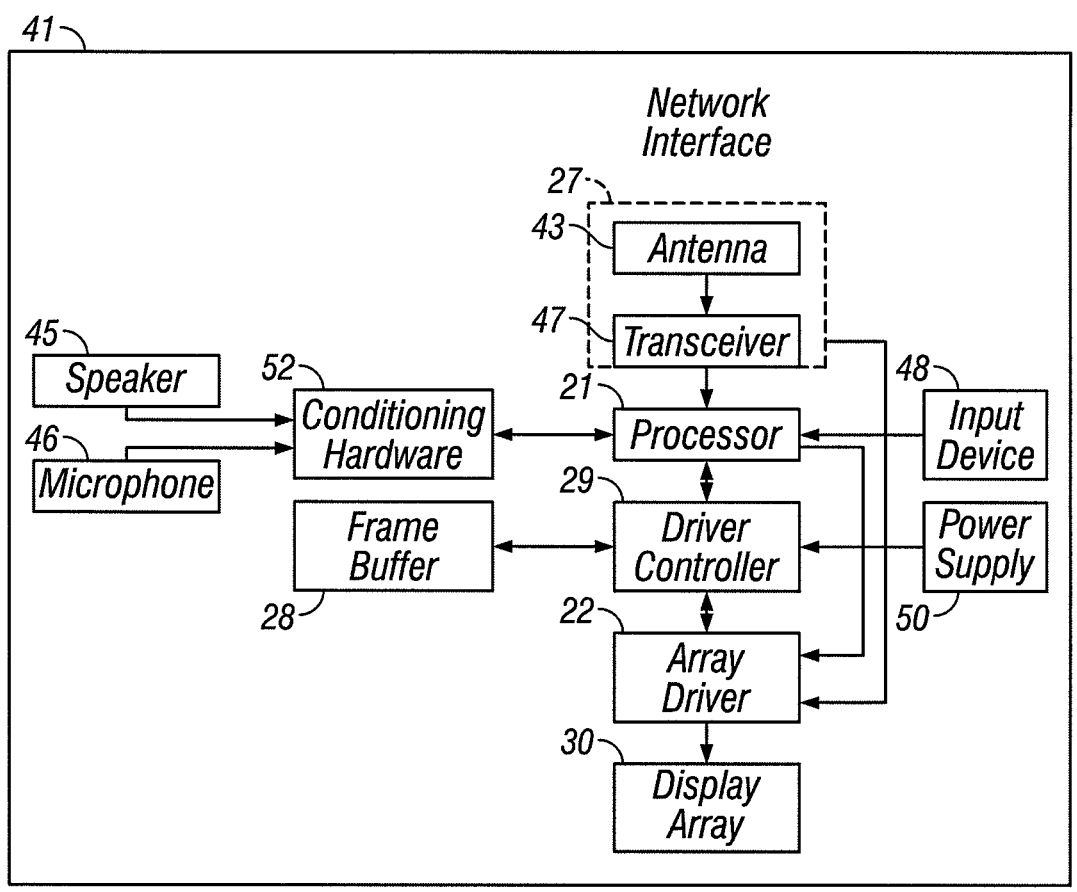

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30.

A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
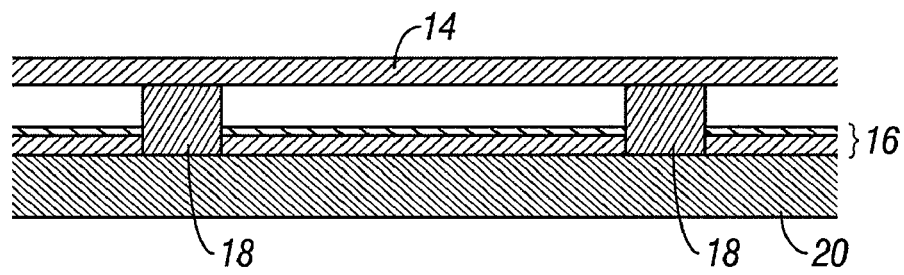
FIG. 7A is a cross section of the device of FIG. 1.
Figure 7B:
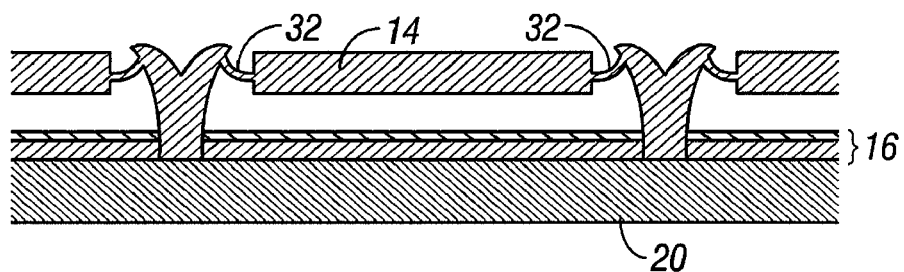
FIG. 7B is a cross section of an alternative embodiment of an interferometric modulator.
Figure 7C:
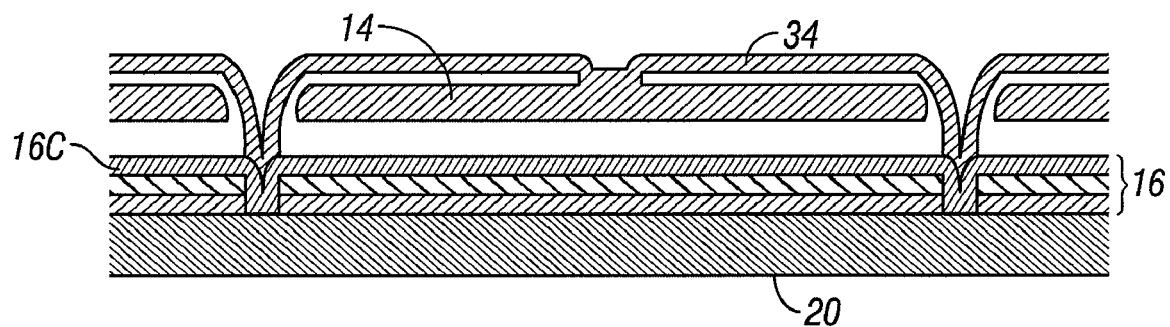
FIG. 7C is a cross section of another alternative embodiment of an interferometric modulator.
Figure 7D:
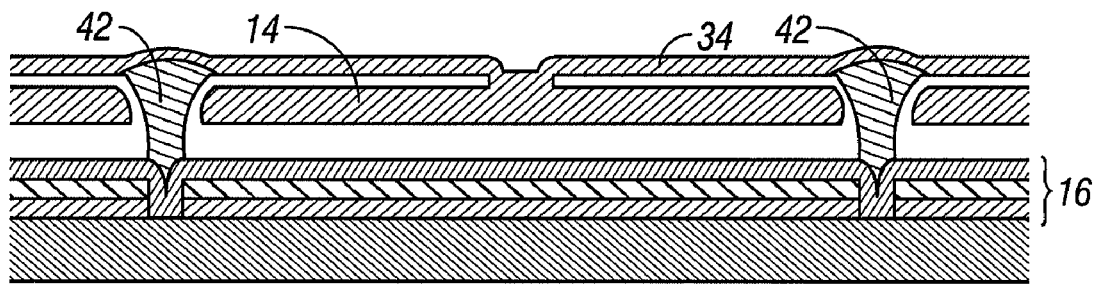
FIG. 7D is a cross section of yet another alternative embodiment of an interferometric modulator.
Figure 7E:
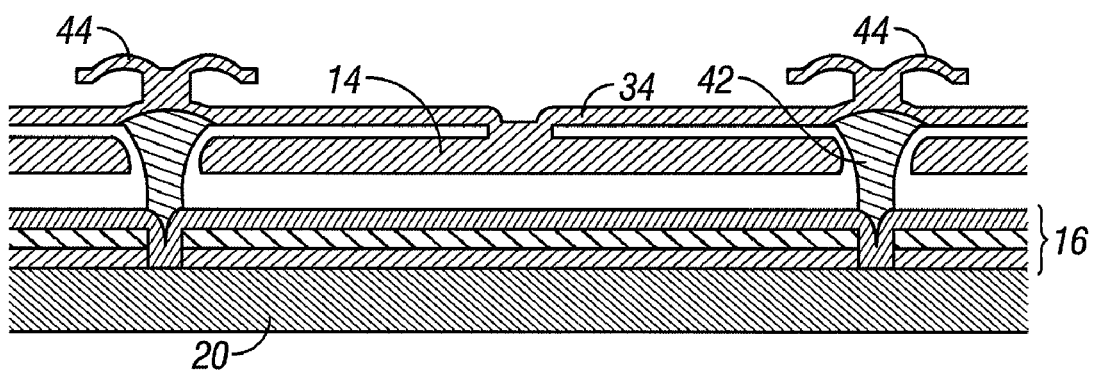
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The interferometric modulators described above may be manufactured using any suitable manufacturing techniques known in the art for making MEMS devices. For example, the various material layers making up the interferometric modulators may be sequentially deposited onto a transparent substrate with appropriate patterning and etching steps conducted between deposition steps. In some embodiments, multiple layers may be deposited during interferometric modulator manufacturing without any etching steps between the deposition steps. For example, the movable reflective layer described above may comprise a composite structure having two or more layers.

Figure 8:
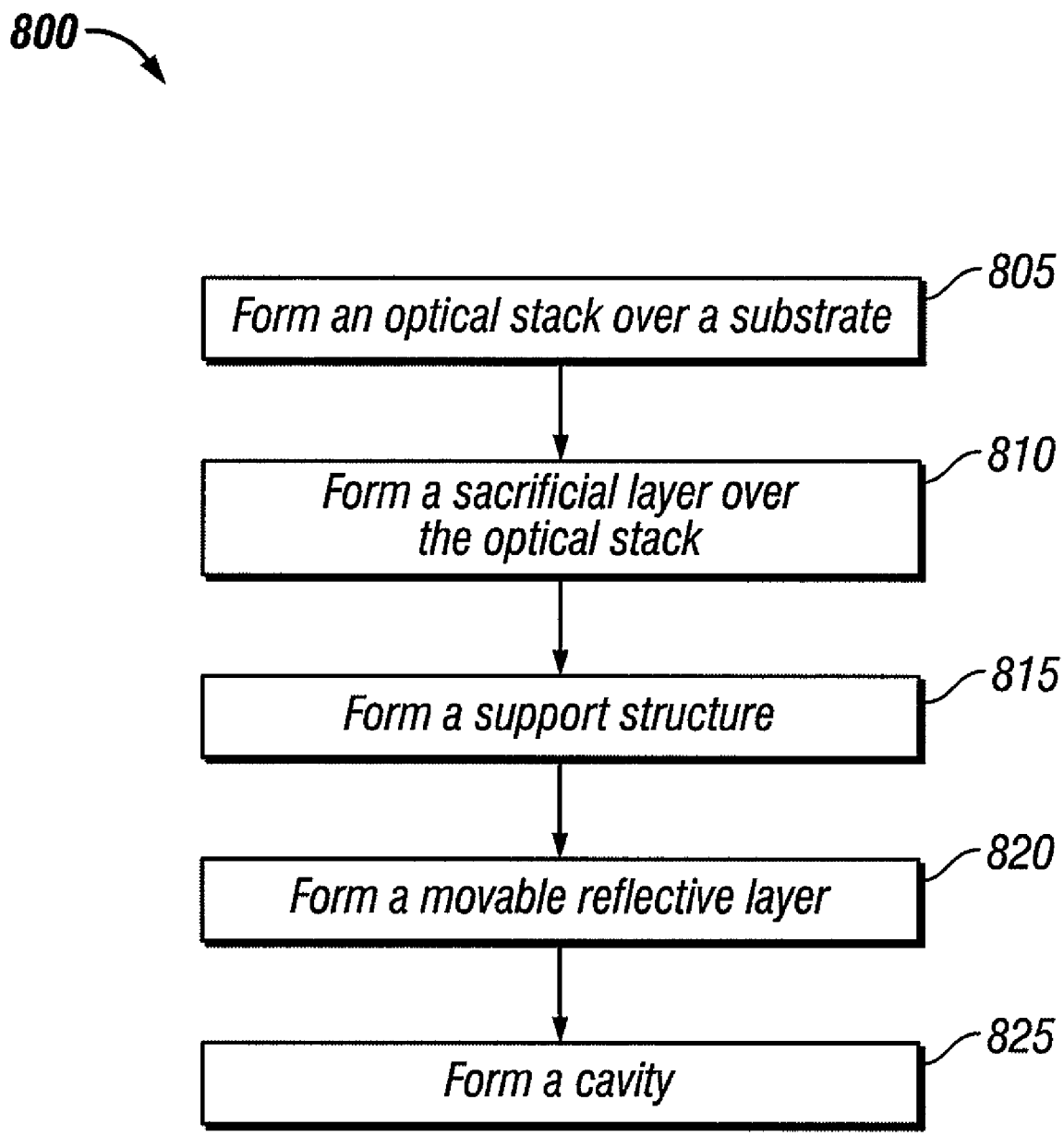
FIG. 8 is a flow diagram illustrating certain steps in an embodiment of a method of making an interferometric modulator.

FIG. 8 illustrates certain steps in an embodiment of a manufacturing process 800 for an interferometric modulator. Such steps may be present in a process for manufacturing, e.g., interferometric modulators of the general type illustrated in FIGS. 1 and 7, along with other steps not shown in FIG. 8. With reference to FIGS. 1, 7 and 8, the process 800 begins at step 805 with the formation of the optical stack 16 over the substrate 20. The substrate 20 may be a transparent substrate such as glass or plastic and may have been subjected to prior preparation step(s), e.g., cleaning, to facilitate efficient formation of the optical stack 16. As discussed above, the optical stack 16 is electrically conductive, partially transparent and partially reflective, and may be fabricated, for example, by depositing one or more of the layers onto the transparent substrate 20. In some embodiments, the layers are patterned into parallel strips, and may form row electrodes in a display device. In some embodiments, the optical stack 16 includes an insulating or dielectric layer that is deposited over one or more metal layers (e.g., reflective and/or conductive layers).

The process 800 illustrated in FIG. 8 continues at step 810 with the formation of a sacrificial layer over the optical stack 16. The sacrificial layer is later removed (e.g., at step 825) to form the gap 19 as discussed below and thus the sacrificial layer is not shown in the resulting interferometric modulator 12 illustrated in FIGS. 1 and 7. The formation of the sacrificial layer over the optical stack 16 may include deposition of a XeF$_2$-etchable material such as molybdenum or amorphous silicon, in a thickness selected to provide, after subsequent removal, a gap 19 having the desired size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

The process 800 illustrated in FIG. 8 continues at step 815 with the formation of a support structure e.g., a post 18 as illustrated in FIGS. 1 and 7. The formation of the post 18 may include the steps of patterning the sacrificial layer to form a support structure aperture, then depositing a material (e.g., a polymer) into the aperture to form the post 18, using a deposition method such as PECVD, thermal CVD, or spin-coating. In some embodiments, the support structure aperture formed in the sacrificial layer extends through both the sacrificial layer and the optical stack 16 to the underlying substrate 20, so that the lower end of the post 18 contacts the substrate 20 as illustrated in FIG. 7A. In other embodiments, the aperture formed in the sacrificial layer extends through the sacrificial layer, but not through the optical stack 16. For example, FIG. 7C illustrates the lower end of the support post plugs 42 in contact with the optical stack 16.

The process 800 illustrated in FIG. 8 continues at step 820 with the formation of a movable reflective layer such as the movable reflective layer 14 illustrated in FIGS. 1 and 7. The movable reflective layer 14 may be formed by employing one or more deposition steps, e.g., reflective layer (e.g., aluminum, aluminum alloy) deposition, along with one or more patterning, masking, and/or etching steps. As discussed above, the movable reflective layer 14 is typically electrically conductive, and may be referred to herein as an electrically conductive layer. Since the sacrificial layer is still present in the partially fabricated interferometric modulator formed at step 820 of the process 800, the movable reflective layer 14 is typically not movable at this stage. A partially fabricated interferometric modulator that contains a sacrificial layer may be referred to herein as an "unreleased" interferometric modulator.

The process 800 illustrated in FIG. 8 continues at step 825 with the formation of a gap, e.g., a gap 19 as illustrated in FIGS. 1 and 7. The gap 19 may be formed by exposing the sacrificial material (deposited at step 810) to an etchant. For example, an etchable sacrificial material such as molybdenum or amorphous silicon may be removed by dry chemical etching, e.g., by exposing the sacrificial layer to a gaseous or vaporous etchant, such as vapors derived from solid xenon difluoride (XeF$_2$) for a period of time that is effective to remove the desired amount of material, typically selectively relative to the structures surrounding the gap 19. Other etching methods, e.g. wet etching and/or plasma etching, may also be used. Since the sacrificial layer is removed during step 825 of the process 800, the movable reflective layer 14 is typically movable after this stage. After removal of the sacrificial material, the resulting fully or partially fabricated interferometric modulator may be referred to herein as a "released" interferometric modulator.

Figure 9:
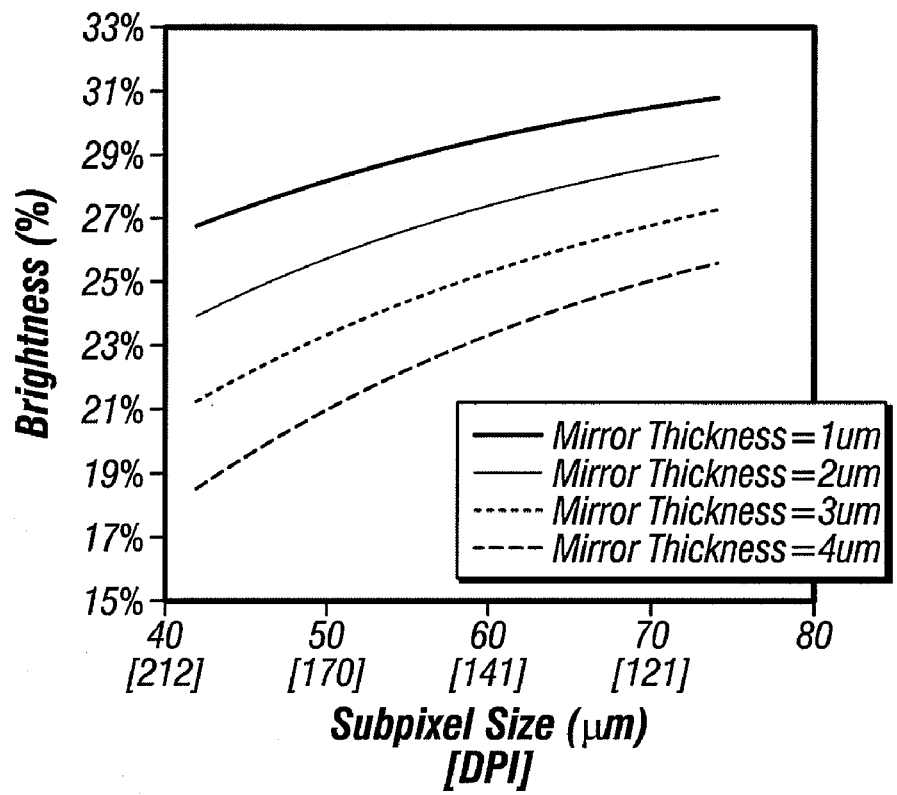
FIG. 9 is a graph depicting the percentage reduction of brightness as a function of pixel size for different levels of mirror CD loss per edge.

Brightness is a desirable characteristic in a number of MEMS devices. While the size of the pixels within an optical MEMS device, such as an interferometric modulator, has some effect on the brightness of the device, the amount of CD loss in the mirror layers during the manufacture of the MEMS device is often a greater factor in its effect on the brightness than pixel size. For example, FIG. 9 depicts the percentage reduction of brightness as a function of the pixel size for different levels of mirror CD loss per edge for an embodiment of an interferometric modulator. The graph in FIG. 9 shows that while increasing the pixel size provides a gradual trend of increased brightness, higher levels of brightness are achieved when CD loss of the mirror layer is minimized. For every 1 µm of CD loss per edge of the mirror in this embodiment, there is approximately a 2.5% drop in brightness.

Figure 10:
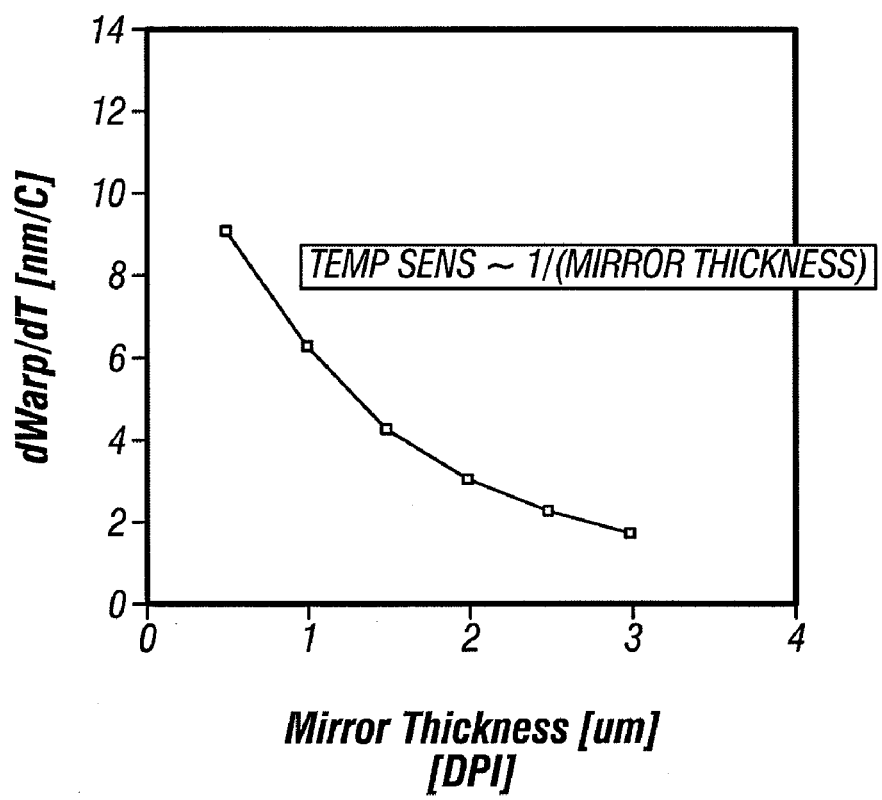
FIG. 10 is a graph depicting the temperature warp sensitivity of a mirror as a function of the thickness of the mirror.

Mirror thickness is related to the ability to control the flatness of the mirror over a large temperature range. Using mirrors with insufficient thickness in an optical MEMS device can result in mirror curvature over time and temperature. FIG. 10 depicts the temperature warp sensitivity of a mirror as a function of the thickness of the mirror for an embodiment of an interferometric modulator. As the thickness of the mirror increases, the warp sensitivity of the mirror decreases. Mirrors in this embodiment are less likely to warp as the thickness increases up to 1.5 microns, preferably up to 2 microns. Therefore, a mirror layer is more likely to remain flat over a larger temperature range when the thickness of the mirror is increased.

While increasing mirror thickness is desirable, doing so may involve more rigorous etching conditions during the fabrication of the MEMS device. The rigorous etching conditions have the consequence of generating greater amounts of CD loss in the mirror layer. CD loss is increased when the horizontal gap between adjacent mirrors in a mirror layer is widened upon etching the mirror layer. By using a thinner mirror layer in the fabrication steps of the MEMS device, the mirror layer is less exposed to etching conditions and CD loss is minimized.

Figure 11A:
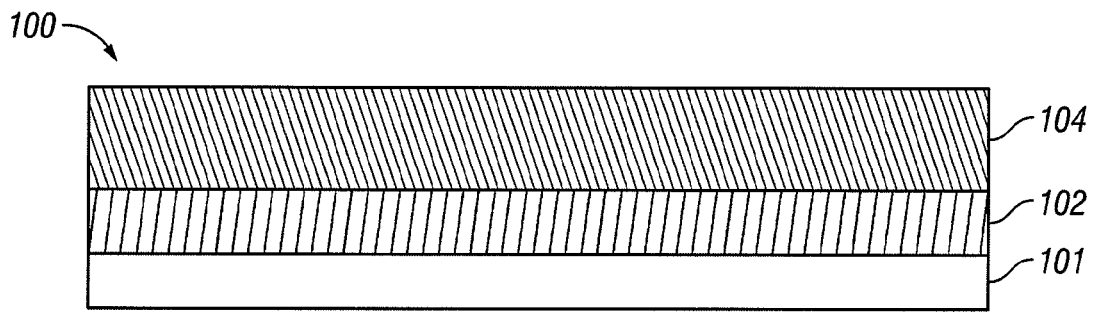
FIGS. 11A through 11C illustrate the CD loss that occurs during the manufacture of a MEMS device according to previously known methods.
Figure 11B:
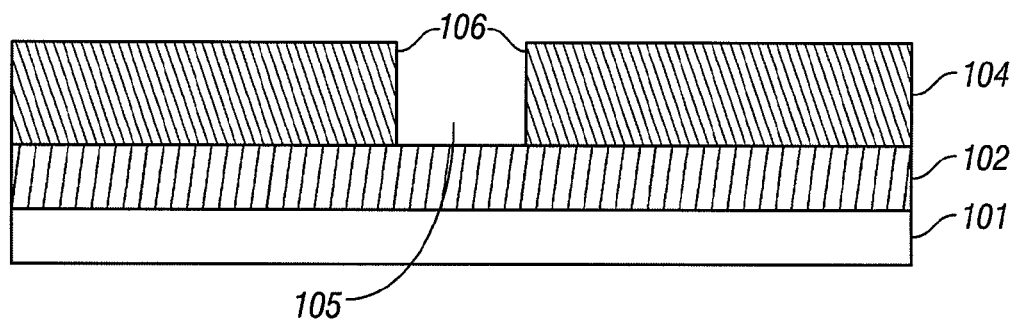
Figure 11C:
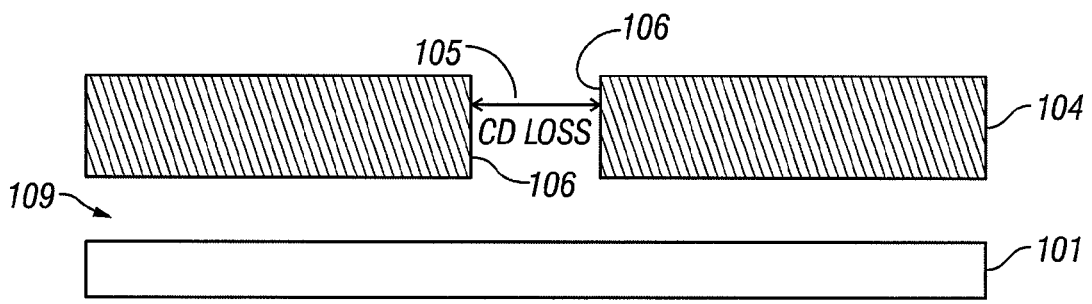

FIGS. 11A through 11C illustrate the CD loss that occurs during the manufacture of a typical mirror layer in a MEMS device according to previously known methods. The structure 100 illustrated in FIG. 11A can be used to form an interferometric modulator, for example, an interferometric modulator of the general type illustrated in FIGS. 1 and 7. For example, the bottom layer 101 in FIG. 11 can correspond to the substrate layer 20 illustrated in FIGS. 1 and 7 and the upper layer 104 in FIG. 11 can correspond to the reflective layer 14 illustrated in FIGS. 1 and 7. Although not illustrated in FIG. 11, additional layers and materials that may be present in an interferometric modulator (e.g. optical stack 16, deformable layer 34, etc.) can also be present in the method illustrated by FIG. 11.

As illustrated in FIG. 11A, the initial steps of fabricating a MEMS device may involve forming a structure 100 by forming a sacrificial layer 102 on a substrate 101, and then depositing a first metal layer 104 onto the sacrificial layer 102. As illustrated in FIG. 11B, the first metal layer 104 is then chemically etched using an etchant that stops on the sacrificial layer 102. The etching step causes the formation of an opening 105 (which corresponds to the CD loss in the metal layer) at the edges 106 of the metal layer 104. In FIG. 11C, the sacrificial layer 102 is removed (e.g. to form a gap 109 underneath the metal layer 104). Support posts (not illustrated), e.g. support posts 18 as represented in FIGS. 1 and 7, can be put in place to maintain the spacing of the gap 109 between the substrate 101 and the first metal layer 104. The gap 109 in FIG. 11C can correspond to the gap 19 in FIG. 1. The surface area and reflectivity of the first metal layer 104 is significantly lessened due to the CD loss of opening 105 and the brightness level of the resulting MEMS device, as perceived by the end user, is lower. The CD loss of opening 105 is even greater when a thicker metal layer 104 is used corresponding to a number of factors. For example, as discussed above, longer etching times and/or higher etching rate etchants are often required with thicker metal layers.

Disclosed herein are methods of fabricating a MEMS device that allow for the use of a relatively thick mirror layer and also minimize the CD loss in the mirror layer during MEMS device fabrication. FIGS. 12A through 12E show an embodiment of the processing steps of manufacturing a MEMS device. The structure 150 illustrated in FIG. 12 can be used to form an interferometric modulator, for example, an interferometric modulator of the general type illustrated in FIGS. 1 and 7. For example, the bottom layer 151 in FIG. 12 can correspond to the substrate layer 20 illustrated in FIGS. 1 and 7 and the upper layer 154 in FIG. 12 can correspond to the reflective layer 14 illustrated in FIGS. 1 and 7. Although not illustrated in FIG. 12, additional layers and materials that may be present in an interferometric modulator (e.g. optical stack 16, deformable layer 34, etc.) can also be present in the method illustrated by FIG. 12 at corresponding locations.

In the initial steps of manufacturing a MEMS device, a sacrificial material 152 is provided over a substrate 151, and then a first metal layer 154 is then formed over the sacrificial material 152 to form a structure 150. The substrate 151 may be a transparent substrate such as glass or plastic and may have been subjected to prior preparation step(s), e.g., cleaning. The substrate may also comprise additional layers, such as those described above in the manufacture of an interferometric modulator. In an embodiment, the underlying substrate further comprises a conductive layer and/or an optical stack (not illustrated).

The sacrificial layer 152 is deposited at any desired thickness level. In an embodiment, the thickness of the sacrificial layer 152 is from about 0.1 micron to about 1 micron. The sacrificial layer 152 provides a space filling material that can be easily etched away without undesirably affecting the other materials. In an embodiment, the sacrificial layer 152 is molybdenum. Other examples of suitable materials for the sacrificial layer include polysilicon, amorphous silicon, or photoresist. In a later step of manufacturing, the sacrificial layer 152 can be etched away to create a gap (e.g., the gap 19) between a movable reflective layer and a dielectric layer or stack.

The materials used in the first metal layer (e.g., metal layer 154) can vary over a wide range to provide desired properties to the MEMS device. In an embodiment, the first metal layer comprises a highly reflective material. Highly reflective materials are useful in optical MEMS devices and can reflect light efficiently. In an embodiment, the first metal layer comprises a metal selected from the group consisting of aluminum, chromium, gold, silver, platinum, nickel, titanium, and tungsten. Other metals can also be used in the first metal layer, including alloys and mixtures of metals. In an embodiment, the first metal layer comprises aluminum. Highly reflective metals, including those described herein, can also form a mirror. In an embodiment, the first metal layer comprises a mirror.

Figure 12A:
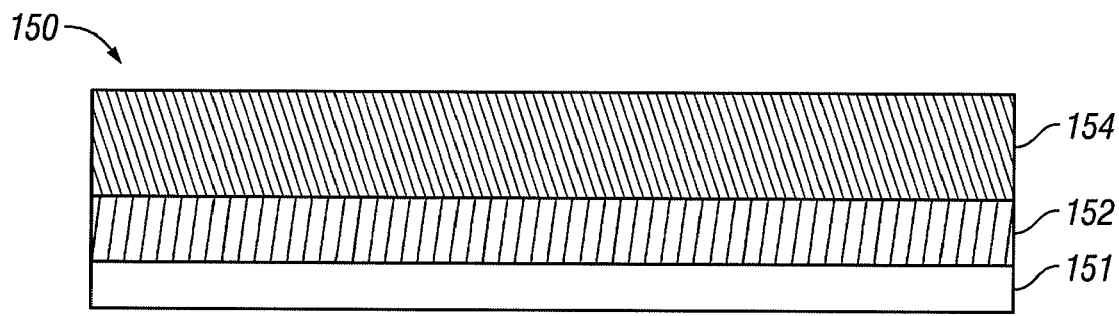
FIGS. 12A through 12E show an embodiment of the processing steps of manufacturing a MEMS device.
Figure 12B:
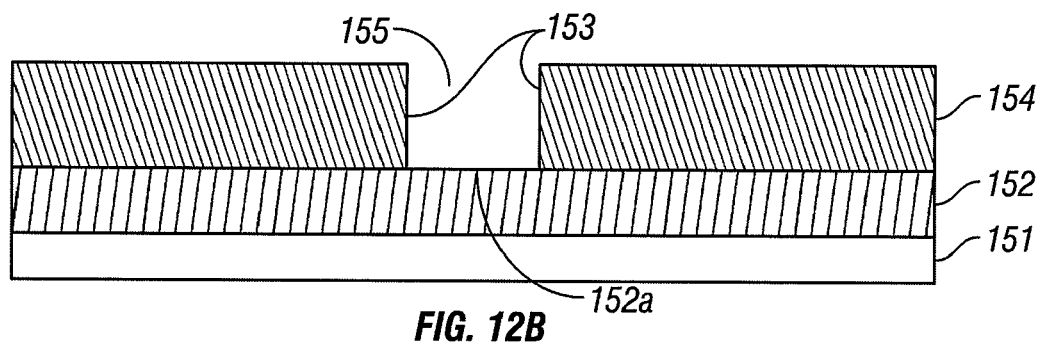

Any known technique may be used to form the first metal layer 154, including deposition techniques such as physical vapor deposition (PVD), chemical vapor deposition (CVD), sputter deposition, and electroplating. The first metal layer 154 can then be masked and etched using conventional masking and etching techniques, such as wet etching or dry etching. In an embodiment, the etching is performed by wet etching. Chemical wet etching allows for selective removal of the first metal layer by using a solution that dissolves the metal layer while the masked portion largely remains intact. As illustrated in FIG. 12B, after etching the first metal layer 154, at least one first opening 155 is formed in the first metal layer 154 at the edges 153 of adjacent metal reflective pieces. The opening 155 exposes a first surface 152a of the sacrificial material 152. The lateral size of the opening 155 (and thus the CD loss) is typically related to the thickness of the first metal layer 154 because greater degrees of lateral etching rates typically result when relatively thicker metal layers are used.

Figure 12C:
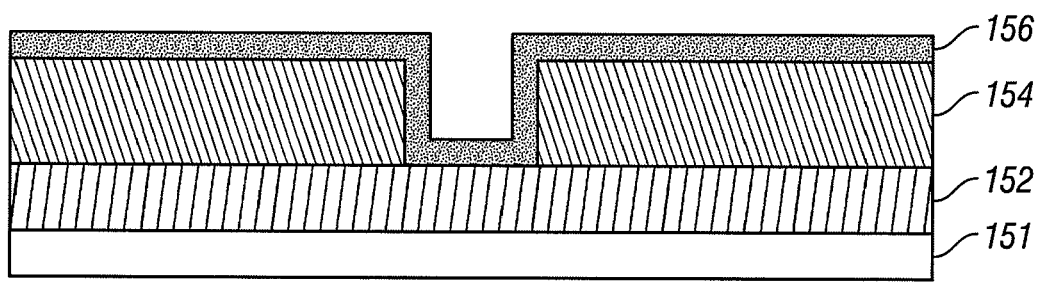

A second layer 156 of material is formed over the first surface 152a of the sacrificial material 152, as illustrated in FIG. 12C. The materials used in the second layer (e.g., layer 156) can vary over a wide range to provide desired properties to the MEMS device, and may or may not include metal. In an embodiment, the second layer comprises a metal. For example, the second layer can comprise the same metallic material used for forming the first metal layer. In an embodiment, the second layer comprises a highly reflective material useful in the manufacture of optical MEMS devices. In an embodiment, the second layer comprises a metal selected from the group consisting of aluminum, chromium, gold, silver, platinum, nickel, titanium, and tungsten. Other metals can also be used in the second layer, including alloys and mixtures of metals. In an embodiment, the second layer comprises aluminum. In an embodiment, the second layer comprises a mirror.

Highly reflective surfaces can also be formed using a metallic material in the second layer that is different from that of the metallic material in the first metal layer. In an embodiment, the second layer (e.g. layer 156) comprises a metal that is different from the first metal layer. Non-metallic layers can also be used for the second layer. For example, where the first metal layer comprises aluminum, the second layer can comprise a metallic material other than aluminum.

In other embodiments, the second layer (e.g. layer 156) can be non-metallic. Non-metallic materials in the second layer can provide additional properties besides increased reflectivity to the first metal layer. In an embodiment, the second layer comprises a dielectric material. For example, the second layer can comprise silicon. In an embodiment, the second layer comprises a polymer. Polymers can be produced in large volumes and they provide a great variety of material characteristics. Any polymer useful in the manufacture of optical MEMS devices can be used in the methods described herein. For example, the polymer can comprise polyethylene, polypropylene, polyester, polyamide, polyimide, etc., and combinations and copolymers thereof.

Figure 12D:
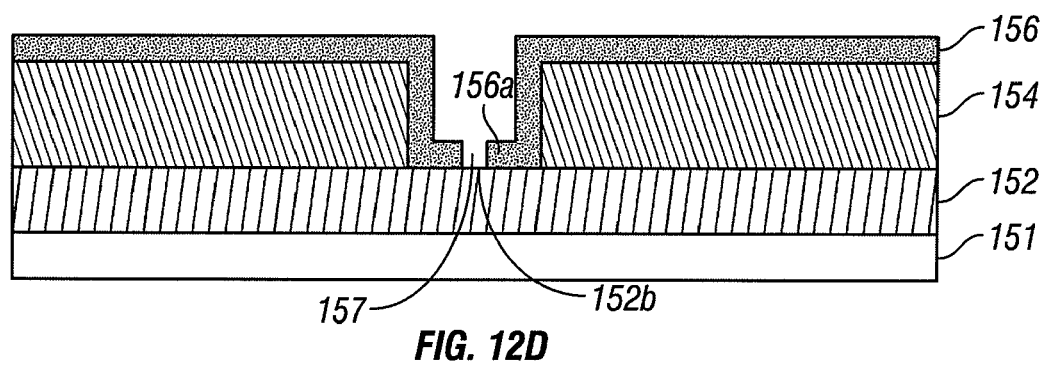

Any known technique may be used to form the second layer 156, including the deposition techniques discussed above. The thickness of the second layer 156 is preferably less than the thickness of the first metal layer 154. The second layer 156 can then be masked and etched using conventional masking and etching techniques, such as wet etching or dry etching. In an embodiment, the etching of the second layer 156 is performed by wet etching. As illustrated in FIG. 12D, etching the second layer 156 creates at least one second opening 157, which also exposes at least a portion 152b of the first surface 152a of the sacrificial material 152. The second opening 157 has a smaller dimension, e.g., lateral dimension, than the first opening 155 created during the etching of the first metal layer 154. By narrowing the opening that was initially created during the first etching step, the total CD loss at the mirror edges in the structure 150 is significantly reduced.

The second opening 157 has a smaller dimension than the first opening 155 because, in part, the second layer 156 of material has a smaller thickness dimension than the first metal layer 154. Etching a thicker layer sometimes involves more vigorous etching conditions and undercutting of the edge of the material can occur, further widening the gap between adjacent materials. The addition of the second layer 156 of material lessens the CD loss because the gap between the materials of the second layer 156 represented by the second opening 157 is less than the gap between the materials of the first metal layer 154 represented by the first opening 155.

Figure 12E:
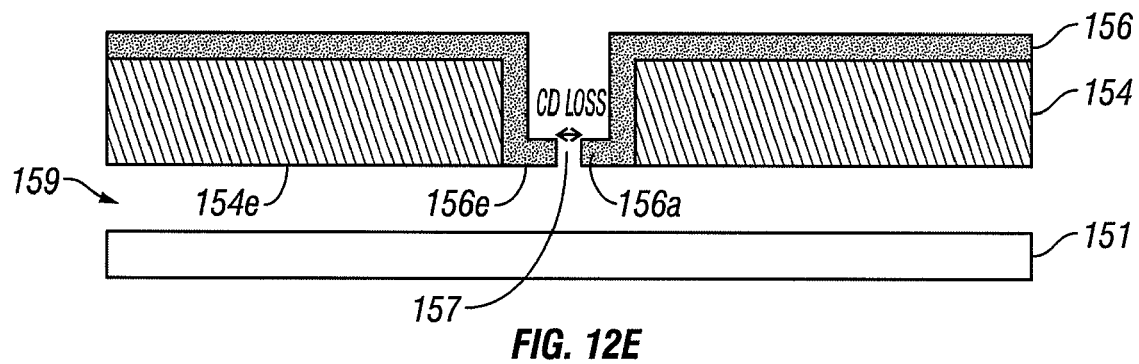

In an embodiment, the first metal layer 154 and the second layer 156, together, have a surface area in contact with the sacrificial material 152 that is larger than that of the first metal layer 154 alone. As illustrated in FIG. 12C, the second layer 156 can be formed over other areas in addition to the first surface 152a of sacrificial material 152, e.g., over the first metal layer 154, including the edges 153 of the first metal layer 154. In an embodiment, the method further comprises forming the second layer 156 over at least a portion of the first metal layer 154. In another embodiment, the second layer 156 is further formed over the entire area of the first metal layer 154, as illustrated, for example, in FIG. 12C.

Where the second layer 156 of material is formed over a portion of the first metal layer 154 and the first surface 152a of exposed sacrificial material 152, and then etched to create a second opening 157, the second layer 156 of material effectively provides a winged extension 156a to the first metal layer 154. As shown in FIG. 12E, the sacrificial layer 152 is removed leaving a surface comprising the first metal layer 154 and the winged extension 156a of the second layer 156 facing the substrate 151 and separated from the substrate 151 by a gap 159. Support posts (not illustrated), e.g. support posts represented in FIGS. 1 and 7, or other structures that separate two layers can be put in place to maintain the spacing of the gap 159 between the substrate 151 and the first metal layer 154. The gap 159 in FIG. 12E can correspond to the gap 19 in FIG. 1.

In an embodiment, the surface comprising the first metal layer 154 and the winged extension 156a of the second layer 156 that faces the substrate 151 is a highly reflective surface, such as a mirror. The CD loss between adjacent mirrors is significantly reduced because the CD loss has been reduced by the winged extension 156a, thus creating a MEMS device having substantially increased brightness due, in part, to the high reflectivity of the mirrors and the large surface area.

The methods described herein can further be used in the formation of electromechanical devices, such as electromechanical devices comprising highly reflective surfaces. In an embodiment, an electromechanical device comprises a mirror. The mirror can be formed using the methods described in FIGS. 12A through 12E. In an embodiment, the mirror comprises a core portion 154 having an exposed reflective surface 154e and an overlaying mirror extension portion 156a also having an exposed reflective surface 156e. As illustrated in the embodiment shown in FIG. 12E, the exposed reflective surface 154e of the core portion 154 and the exposed reflective surface 156e of the mirror extension portion 156a are co-planar.

In an embodiment, and discussed in further detail below, the overlaying mirror extension portion 156a has at least a portion of its thickness dimension smaller than the thickness dimension of the core portion 154. The core portion 154 of the mirror can comprise a homogenous material. In an embodiment, the core portion 154 of the mirror is a unitary material. In an embodiment, the core portion 154 of the mirror comprises a single layer.

The methods of fabricating a MEMS device described herein are not limited to providing a first metal layer and a second layer. Additional layers can be provided without departing from the scope of the teachings herein. In an embodiment (not illustrated), the method of fabricating a MEMS device further comprises forming a third layer over the portion 152b of the first surface 152a of the sacrificial material 152 in a manner similar to that depicted in FIG. 12 and described above. In an embodiment, the third layer has a smaller thickness dimension than the second layer 156. The third layer can then be patterned and etched to form at least one third opening in the third layer, whereby the third opening exposes at least a portion of the portion 152b of the first surface 152a of the sacrificial material 152. Preferably, the third opening has a smaller dimension, e.g., lateral dimension, than the second opening 157, thus further reducing CD loss.

Multiple formations of additional layers with decreasingly smaller thickness dimensions can further compensate for the CD loss that occurs during fabrication of MEMS devices. For example, in an embodiment, a fourth layer is formed over a portion of the first surface 152a of sacrificial material 152 with a smaller thickness dimension than the previous layer. After similar pattern and etching processing steps previously performed on the second and third layers are performed on the fourth layer, a fourth opening exposes at least a portion of the first surface 152a of sacrificial material 152, whereby the fourth opening has a smaller dimension, e.g., lateral dimension, than the third opening. The number of layers useful in the methods described herein is not limited. For example, the methods of fabricating a MEMS device may comprise manufacturing steps using anywhere from two to ten layers, or more. Additional layers can be formed using similar deposition techniques as described above with regards to the second layer, such that each additional layer formed has a smaller thickness dimension than the layer deposited before it.

Thus, electrochemical devices made in accordance with the methods described can optionally have further overlaying mirror extension portions. In an embodiment, the electrochemical devices described herein comprise a second overlaying mirror extension portion having an exposed reflective surface, wherein the exposed reflective surface of the second overlaying mirror extension is co-planar with the exposed reflective surfaces of the core portion and the first mirror extension portion. Additional overlaying mirror extension portions are further contemplated. As described in greater detail below, the second overlaying mirror extension portion can have at least a portion of its thickness dimension smaller than the thickness dimension of the core portion. Furthermore, the optional second overlaying mirror extension portion can also have at least a portion of its thickness dimension smaller than the thickness dimension of the first overlaying mirror extension portion.

By fabricating a MEMS device according to the method described in FIG. 12, CD loss is significantly reduced, even while using relatively thick mirrors. For example, CD loss can be less than 7 microns on a mirror having a thickness of greater than about 0.75 microns. Additionally, CD loss can be less than 7 microns on a mirror having a thickness greater than about 1 micron.

Another method of fabricating a MEMS device may be used that can also provide winged extensions to the edge of a metal layer, thereby reducing CD loss. The initial steps of fabricating the MEMS device according to this embodiment are similar to those disclosed above with respect to the embodiment shown in FIG. 12. For example, a first metal layer is formed over a sacrificial layer and then etched to provide and at least one opening in the first metal layer. However, the winged extensions are provided to the first metal layer in a different manner. Each of the at least one openings separate two or more portions (e.g. mirrors) of the first metal layer. A second layer can be deposited, masked, and etched from one side of the opening so as to provide a winged extension to one of the mirrors. Then, a third layer can be deposited, masked, and etched from the other side of the opening so as to provide a winged extension to the other mirror layer. The lateral dimension of the opening can be significantly reduced by this method of offset patterning and etching using precision masking and etching techniques. As the lateral dimension of the opening is reduced, CD loss in the resulting MEMS device is also reduced.

FIGS. 13A through 13F illustrate this embodiment of the processing steps used in the manufacture of a MEMS device. The structure 200 illustrated in FIG. 13 can be used to form an interferometric modulator, for example, an interferometric modulator of the general type illustrated in FIGS. 1 and 7. For example, the bottom layer 201 in FIG. 13 can correspond to the substrate layer 20 illustrated in FIGS. 1 and 7 and the upper layer 204 in FIG. 13 can correspond to the reflective layer 14 illustrated in FIGS. 1 and 7. Although not illustrated in FIG. 13, additional layers and materials that may be present in an interferometric modulator (e.g. optical stack 16, deformable layer 34, etc.) can also present in the method illustrated by FIG. 13 at corresponding locations.

The fabrication methods illustrated in FIGS. 13A through 13F optionally comprise forming an etch stop after each deposition. While using etch stops after depositions requires additional processing steps, such methods can further significantly decrease CD loss because the final CD loss dimension is determined by the edges of the mirror from different deposition steps.

In the initial steps of manufacturing a MEMS device, a sacrificial material 202 is provided over a substrate 201, and then a first metal layer 204 is then formed over the sacrificial material 202. The materials used for each of the substrate 201, sacrificial material 202, and first metal layer 204 can vary. Preferably, the type of materials used in each of the substrate 201, sacrificial material 202, and first metal layer 204 in this embodiment are similar to those described above in the corresponding portions of FIG. 12 (e.g., substrate 151, sacrificial material 152, and first metal layer 154, respectively).

Figure 13A:
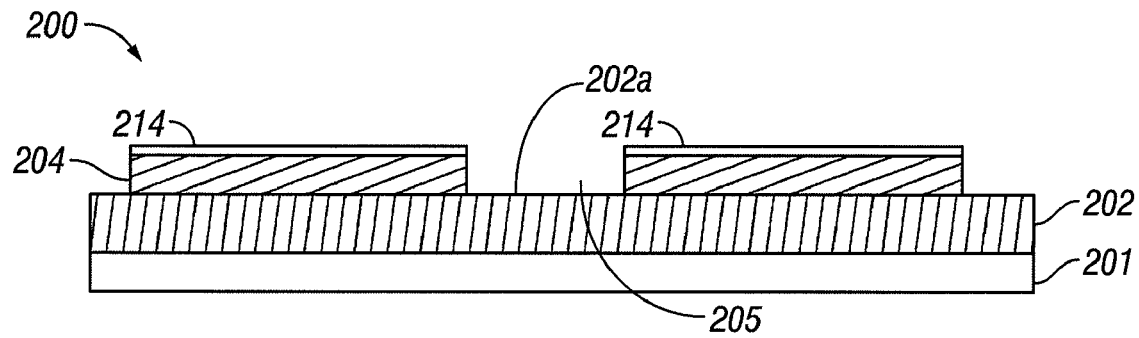
FIGS. 13A through 13F show another embodiment of the processing steps of manufacturing a MEMS device.

Any known technique may be used to form the first metal layer 204, including deposition techniques such as PVD, CVD, sputtering, and electroplating. The first metal layer 204 is then masked and etched using either wet etching or dry etching techniques. FIG. 13A illustrates a structure 200 after initial formation of the first metal layer and after the initial masking and etching steps. A masking layer 214 remains over the first metal layer, and can optionally be removed.

Removal of the masking layer 214 may depend on subsequent etchants used in subsequent processing steps. Etchants are selected based on the material to be etched, and each etchant can affect materials differently. For example, the masking layer can be removed if a different etchant is to be used in later processing steps that does not affect the first metal layer. In some embodiments, the masking layer 214 can remain with further layer formations. For example, if subsequent layers comprise a similar material to the first metal layer that will also be etched with a similar etchant, the masking layer can remain to protect the first metal layer from the etchant.

In an embodiment, the etching is performed by wet etching. After etching the first metal layer 204, at least one first opening 205 is formed in the first metal layer 204 to form structure 200, as illustrated in FIG. 13A. The opening 205 exposes a first surface 202a of the sacrificial material 202. The size of the opening 205 is related to the thickness of the first metal layer 204 because greater degrees of etching are typically involved when thicker layers are used.

Figure 13B:
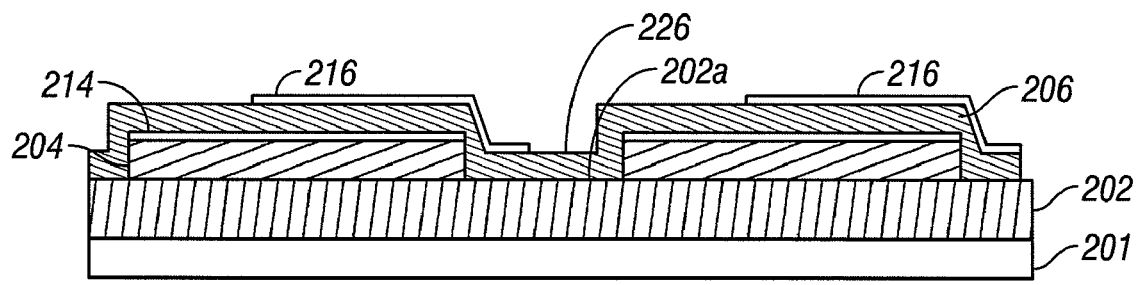

As illustrated in FIG. 13B, a second layer 206 is then formed over the first surface area 202a of the sacrificial material 202. After the second layer is formed, a masking layer 216 is further formed over the second layer 206 and over a portion of the first surface area 202a of the sacrificial material 202 to thereby form an unmasked portion 226 of the second layer 206 over the first surface 202a from FIG. 13A.

Figure 13C:
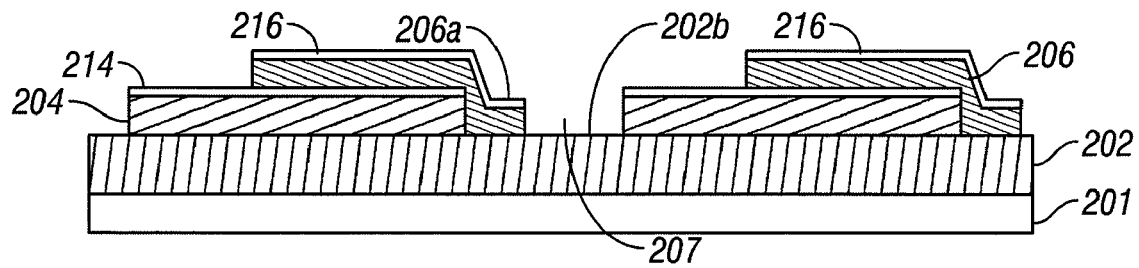

As illustrated in FIG. 13C, the unmasked portion 226 of the second layer 206 is then etched, using conventional etching techniques, to form at least one opening 207 in the second layer 206. In an embodiment, the etching is performed using a wet etch technique. The at least one opening 207 in the second layer exposes a second surface area 202b of the sacrificial material 202. The second surface area 202b of the sacrificial material 202 is smaller than the first surface area 202a of the sacrificial material 202, illustrated in FIG. 13A. The portion of the second layer 206 under the mask 216 is protected from the etching step and remains with the structure. Following the etching step, the masking layer 216 can optionally be removed. Removal of the masking layer 216 may depend on the subsequent etching and processing steps to be used, as discussed above.

As illustrated in FIG. 13C, at least a portion of the second layer 206 forms a winged extension 206a of the first metal layer 204 from one side and serves to at least partially fill and therefore, decrease the size of the opening 207. The materials used for the second layer 206 can vary, e.g., metallic or non-metallic. Preferably, the materials used for the second layer 206 in this embodiment are similar to those described above in the corresponding portions of FIG. 12 (e.g., second layer 156).

The second layer 206 can be formed over areas other than the first surface 202a of sacrificial material 202. In an embodiment (and as shown in FIG. 13), the second layer 206 is further formed over at least a portion of the first metal layer 204 in addition to being formed over the first surface 202a of sacrificial material 202. In an embodiment, the second layer 206 has a smaller thickness dimension than the first metal layer 204.

Figure 13D:
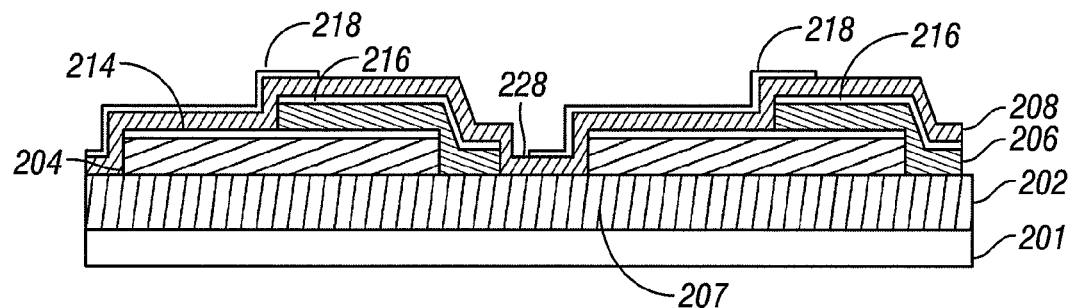

FIG. 13D further illustrates another embodiment, wherein the method further comprises forming a third layer 208 over at least a portion of the exposed second surface area 202b (from FIG. 12C) of the sacrificial material 202. It is also contemplated that the third layer 208 can be further formed over at least a portion of the first metal layer 204 and/or at least a portion of the second layer 206. An additional masking layer 218 is formed over the third layer 208 and over a portion of the second surface area 202b of the sacrificial material 202 forming an unmasked portion 228 of the third layer 208 over the second surface area 202b.

Figure 13E:
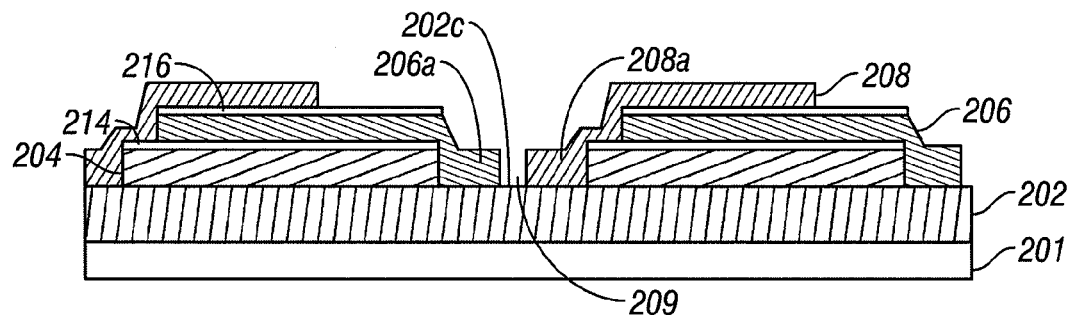

As illustrated in FIG. 13E, the unmasked portion 228 of the third layer 208 is then etched, such as by wet etching, to form at least one opening 209 in the third layer 208. The portion of the third layer 208 under the mask 218 is protected from the etching step and remains. Masking layer 218 can, in some embodiments, subsequently be removed. After etching, at least a portion of the third layer 208 forms a winged extension 208a of the first metal layer 204 from the opposite side of the opening that the other winged extension 206a filled in. Thus, winged extension 208a also serves to at least partially fill and therefore, decrease the size of the opening 209.

The materials used for the third layer 208 can vary, e.g., metallic or non-metallic. Preferably, the materials used for the third layer 208 in this embodiment are similar to those described above in the second layer 156 of FIG. 12. The at least one opening 209 in the third layer 208 exposes a third surface area 202c of the sacrificial material 202. The third surface area 202c of the sacrificial material 202 is smaller than the second surface area 202b of the sacrificial material.

The CD loss in a mirror layer is minimized using the fabrication methods shown in FIGS. 13A through 13E. FIG. 13C shows that the second layer 206 minimized the CD loss of the in the first metal layer 204 from one edge, e.g., one mirror; while FIG. 13E shows that the third layer 208 minimized CD loss of the first metal layer 204 from the other edge, e.g., mirror. By alternating the formation of additional layers on the edges of the mirrors using etch stops, e.g., offset patterning, CD loss is significantly reduced, even while using relatively thick mirrors. For example, CD loss can be less than 7 microns on a mirror having a thickness of greater than about 0.75 microns. Additionally, CD loss can be less than 7 microns on a mirror having a thickness greater than about 1 micron.

Figure 13F:
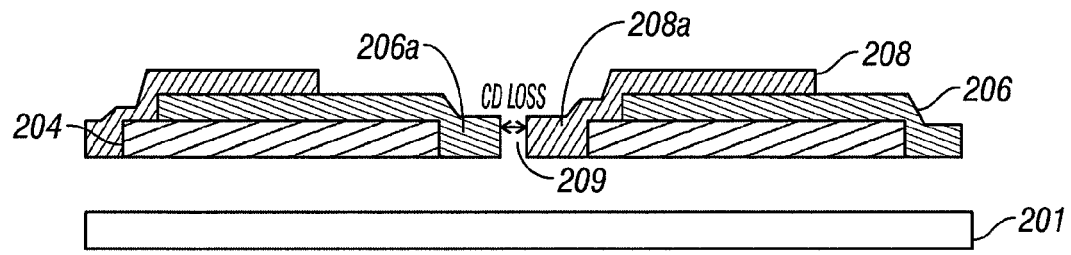

Afterward, the sacrificial material can be removed from the structure. FIG. 13F shows the removal of the sacrificial layer 202 to form a gap 210. Support posts (not illustrated), e.g. support posts as represented in FIGS. 1 and 7, can be put in place to maintain the spacing of the gap 210 between the substrate 201 and the first metal layer 204. The gap 210 in FIG. 13F can correspond to the gap 19 in FIG. 1. While the masking layers 214, 216, and 218 are not illustrated in FIG. 13F, in some embodiments, any one or more of masking layers can be present. The CD loss between adjacent mirrors in the first metal layer 204 has been significantly reduced by winged extensions 206a and 208a, which were supplied from the second layer 206 and third layer 208, respectively.

Subsequent layers can be further provided in an analogous fashion. The materials used in any additional layer (e.g. fourth layer, fifth layer, sixth layer, etc.) can vary over a wide range to provide desired properties to the MEMS device. For example, additional layers can be either metallic or non-metallic, as discussed above. Suitable metals include aluminum, chromium, gold, silver, platinum, nickel, titanium, and tungsten. Additional layers, via winged extensions, such as 206a and 208a can provide increased reflectivity to the first metal layer. It is further contemplated that the winged extensions can be non-metallic and provide properties other than reflectivity.

The thicknesses of the first metal layer, the second layer, and any subsequent layers in all of the embodiments described herein can vary and those having ordinary skill in the art, guided by the disclosure herein, can provide layers with appropriate thicknesses using various deposition techniques. Selection of appropriate thickness can depend on the desired flexibility of the layer in the end use of the product.

In an embodiment, the first metal layer in any embodiment has a thickness in the range of about 0.1 microns to about 10 microns. In an embodiment, the first metal layer has a thickness in the range of about 0.75 microns to about 3 microns. In an embodiment, the first metal layer has a thickness in the range of about 1 micron to about 2.5 microns. In an embodiment, the first metal layer has a thickness of about 1 micron. In an embodiment, the first metal layer has a thickness of about 2 microns. In an embodiment, the first metal layer has a thickness of about 3 microns.

Preferably, the second layer has a smaller thickness dimension than the first metal layer. In an embodiment, the second layer in any embodiment has a thickness in the range of about 0.01 microns to about 2 microns. In an embodiment, the second layer has a thickness in the range of about 0.02 microns to about 0.2 microns. In an embodiment, the second layer has a thickness in the range of about 0.03 microns to about 0.1 microns.

Where additional layers are formed after the second layer in any of the embodiments described herein, the thickness of those layers can be in about a similar range as for the second layer. However, it is preferable, though not required, that the thicknesses of the additional layers be less than the thickness of the layer that had been formed before it.

In embodiments where the first metal layer and the second layer, together, comprise a mirror, e.g., where second layer comprises the same metal that is used in the first metal layer, the combined thicknesses of the first metal layer and the second layer equal the overall thickness of the mirror, in the absence of the wing portion. One can individually select the thickness of the first metal layer and the second layer to create a mirror having a desired final thickness. For example, a first metal layer having a thickness of 1.9 microns can be combined with a second layer having a thickness of 0.1 microns to create a mirror having a total overall thickness of 2 microns, not counting the thickness of the wing portion.

Another embodiment provides an interferometric modulator fabricated by the methods described herein, including the methods illustrated by FIGS. 12A through 12E and FIGS. 13A through 13F. For example, an interferometric modulator can be fabricated using the flow diagram shown in FIG. 8. The MEMS devices fabricated by the methods described herein comprise mirror layers with high reflectivity because the methods minimize the amount of CD loss in the mirrors.

Another embodiment provides an interferometric modulator comprising a plurality of mirrors, wherein the horizontal spacing between the plurality of mirrors is minimized. In an embodiment, an interferometric modulator comprises a substrate, an optical layer patterned into rows, a mechanical layer patterned into columns, a mirror layer separated from the optical layer by a vertical gap and comprising a plurality of mirrors, wherein the mirror layer has a thickness greater than or equal to about 0.75 microns; and wherein the plurality of mirrors are separated from one another by a horizontal gap that is less than or equal to about 7 microns. Such dimensions of mirror thickness and horizontal gap spacing are made possible using the methods described herein.

The interferometric modulators described herein provide minimal gap spacing between mirrors, wherein the mirror thickness is greater than about 0.75 microns. In an embodiment, the gap spacing between mirrors is less than or equal to about 7 microns, wherein the mirror thickness is greater than about 1 micron. In an embodiment, the gap spacing between mirrors is less than or equal to about 7 microns, wherein the mirror thickness is greater than about 1.5 microns.

Mirror thickness can be altered by adjusting the amount of metal that is initially deposited on the sacrificial material. In an embodiment, the mirror has a thickness in the range of about 0.75 microns to about 3 microns. In an embodiment, the mirror has a thickness in the range of about 1 micron to about 2.5 microns. In an embodiment, the mirror has a thickness in the range of about 1.5 microns to about 2 microns. Thicker mirrors provide increased rigidity and are less likely to warp during use of the MEMS device.

In addition to minimized horizontal gap spacing between mirrors having a thickness greater than about 0.75 microns, the plurality of mirrors can also have a relatively large surface area. Surface area of the mirror can be increased by providing winged extensions to the first metal layer, wherein the winged extensions are also made from a highly reflective material. The methods of fabricating a MEMS device described herein provide the unique combination of relatively large mirror thickness, relatively high surface area of the mirror layer, and low CD loss between adjacent mirrors. In an embodiment, each of the plurality of mirrors has at least one longitudinal or lateral dimension greater than about 20 microns. In an embodiment, each of the plurality of mirrors has at least one longitudinal or lateral dimension greater than about 25 microns. In an embodiment, each of the plurality of mirrors has at least one longitudinal or lateral dimension greater than about 30 microns.

Figure 14:
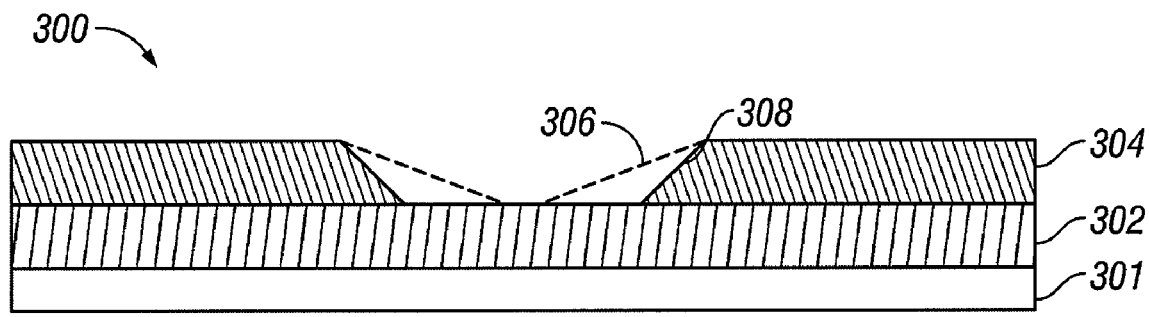
FIG. 14 is an embodiment of a MEMS device having a reflective layer with tapered edges.

In an embodiment, the mirror has tapered edges. Tapered edges can be provided by forming a first metal layer that is tapered, e.g. trapezoidal in cross-sectional shape. Tapered edges can also be formed by shaping the winged extensions during subsequent layer formations. FIG. 14 is an embodiment of a structure 300 having a reflective layer with tapered edges. A sacrificial layer 302 is formed on top of a substrate 301 and a mirror layer 304 is subsequently deposited on top of the sacrificial material 302. The mirror layer 304 is provided with a tapered edge 306. During the course of etching the mirror layer 304, the degree of the taper is lessened over time, as the edges of the taper 306 have a smaller thickness than the interior portion of the taper 306, causing undercutting at the mirror edge. After the mirror layer 304 is etched, the tapered edge 306 is eroded slightly to form the final taper 308. The thickness of the tapered edges varies along the length of the taper. In an embodiment, the tapered edges have a thickness of about 0.01 microns to about 2 microns at any point in the taper. In an embodiment, the tapered edges have a thickness of about 0.02 microns to about 1 micron at any point in the taper.

In an embodiment, the MEMS fabrications steps described herein can be used to make an interferometric modulator. In an embodiment, the interferometric modulator further includes a display. In some embodiments, the interferometric modulator includes a processor. The process can be configured to communicate with the display. Additionally, the processor can be configured to process image data. In some embodiments, the interferometric modulator includes a memory device that is configured to communicate with said processor. In an embodiment, the interferometric modulator further includes a driver circuit configured to send at least one signal to the display.

In an embodiment, the interferometric modulator further includes a controller configured to send at least a portion of the image data to the driver circuit. In an embodiment, the interferometric modulator further includes an image source module configured to send said image data to said processor. In an embodiment, the image source module includes at least one of a receiver, transceiver, and transmitter. In an embodiment, the interferometric modulator further includes an input device configured to receive input data and to communicate said input data to said processor.

What is claimed is:

1. A method of fabricating an electromechanical systems device, comprising:
    providing a sacrificial material;
    forming a first metal layer over the sacrificial material;
    etching the first metal layer to form at least one first opening in the first metal layer to thereby expose a first surface of the sacrificial material;
    forming a second layer over the first surface of the sacrificial material, wherein the second layer has a smaller thickness dimension than the first metal layer; and
    etching the second layer to form at least one second opening in the second layer to thereby expose at least a portion of the first surface of the sacrificial material, wherein the second opening has a smaller dimension than the first opening.

2. The method according to claim 1, wherein etching the first metal layer comprises wet-etching.

3. The method according to claim 1, wherein etching the second layer comprises wet-etching.

4. The method according to claim 1, further comprising forming the second layer over at least a portion of the first metal layer.

5. The method according to claim 1, wherein the first metal layer comprises a mirror.

6. The method according to claim 1, wherein the second layer comprises a metal.

7. The method according to claim 6, wherein the second layer comprises a mirror.

8. The method according to claim 6, wherein the first metal layer and the second layer comprise the same metal.

9. The method according to claim 8, wherein the first metal layer and the second layer together have a surface area in contact with the sacrificial material that is larger than that of the first metal layer alone.

10. The method according to claim 1, wherein the first metal layer has a thickness in the range of about 0.75 microns to about 3 microns.

11. The method according to claim 1, wherein the second layer has a thickness in the range of about 0.02 microns to about 0.2 microns.

12. The method according to claim 1, wherein the sacrificial material is provided on an underlying substrate.

13. The method according to claim 12, wherein the underlying substrate comprises a conductive layer.

14. The method according to claim 13, further comprising removing the sacrificial material to thereby form a gap between the first metal layer and the conductive layer.

15. A method for fabricating an electromechanical systems device, comprising:
    providing a sacrificial material;
    forming a first metal layer over the sacrificial material;
    etching the first metal layer to form at least one opening in the first metal layer to thereby expose a first surface area of the sacrificial material;
    forming a second layer over the first surface area of the sacrificial material, the second layer having a smaller thickness dimension than the first metal layer;
    forming a first masking layer over the second layer and over a portion of the first surface area of the sacrificial material to thereby form an unmasked portion of the second layer over the first surface area; and
    etching the unmasked portion of the second layer to form at least one opening in the second layer to thereby expose a second surface area of the sacrificial material, wherein the resulting exposed second surface area of the sacrificial material is smaller than the first surface area of the sacrificial material.

16. The method according to claim 15, further comprising the step of removing the first masking layer.

17. The method according to claim 15, wherein etching the first metal layer comprises wet-etching.

18. The method according to claim 15, wherein etching the second layer comprises wet-etching.

19. The method according to claim 15, wherein the second layer is further formed over at least a portion of the first metal layer.

20. The method according to claim 15, wherein the first metal layer comprises a mirror.

21. The method according to claim 15, wherein the second layer comprises a metal.

22. The method according to claim 21, wherein the second layer is a mirror layer.

23. The method according to claim 15, wherein first metal layer has a thickness in the range of about 0.75 microns to about 3 microns.

24. The method according to claim 15, wherein second layer has a thickness in the range of about 0.02 microns to about 0.2 microns.

25. The method according to claim 15, further comprising:
forming a third layer over at least a portion of the exposed second surface area of the sacrificial material;
forming a second masking layer over the third layer and over a portion of the second surface area of the sacrificial material to thereby form an unmasked portion of the third layer over the second surface area; and
etching the unmasked portion of the third layer to form at least one opening in the third layer to thereby expose a third surface area of the sacrificial material, wherein the third surface area of the sacrificial material is smaller than the second surface area of the sacrificial material.

26. The method according to claim 25, wherein the third layer has a thickness in the range of about 0.02 microns to about 0.2 microns.

\* \* \* \* \*